United States Patent [19]

Picado

[11] Patent Number: 5,149,921
[45] Date of Patent: Sep. 22, 1992

[54] SELF CORRECTING INFRARED INTRUSION DETECTION SYSTEM

[75] Inventor: Sergio Picado, London, Ark.

[73] Assignee: Innovation Industries, Inc., Russelville, Ark.

[21] Appl. No.: 728,241

[22] Filed: Jul. 10, 1991

[51] Int. Cl.$^5$ .............................................. B66B 3/00
[52] U.S. Cl. ................................................... 187/130
[58] Field of Search ....................... 187/56, 48; 49/25; 250/221

[56] References Cited

U.S. PATENT DOCUMENTS

| | | | |
|---|---|---|---|
| Re. 33,668 | 8/1991 | Gray | 187/56 |
| 3,370,677 | 2/1968 | Federmann et al. | 187/48 |
| 3,719,938 | 3/1973 | Perlman | 340/556 |
| 3,746,863 | 7/1973 | Pronovost | 250/561 |
| 3,852,592 | 12/1974 | Scoville et al. | 250/221 |
| 3,886,413 | 5/1975 | Dow et al. | 361/181 |
| 3,965,355 | 6/1976 | Maccabee | 250/341 |
| 3,970,846 | 7/1976 | Schofield, Jr. et al. | 250/221 |
| 4,029,176 | 6/1977 | Mills | 187/52 R |
| 4,266,124 | 5/1981 | Weber et al. | 250/221 |
| 4,472,908 | 9/1984 | Wanzl et al. | 49/25 |
| 4,669,218 | 6/1987 | Kornbrekke et al. | 49/25 |
| 4,742,337 | 5/1988 | Haag | 340/556 |
| 4,794,248 | 12/1988 | Gray | 250/221 |
| 4,894,952 | 1/1990 | Trett et al. | 49/25 |
| 4,910,464 | 3/1990 | Trett et al. | 328/5 |
| 4,914,859 | 4/1990 | Gionet et al. | 49/25 |

*Primary Examiner*—A. D. Pellinen
*Assistant Examiner*—Lawrence E. Colbert
*Attorney, Agent, or Firm*—Stephen D. Carver

[57] ABSTRACT

A self correcting infrared intrusion detection system primarily for elevator doors establishes multiple through-beams to intelligently detect passengers and adjust for environmental changes. Beam patterns are monitored by software that differentiates between intrusions and malfunctions and adjusts itself automatically when hardware partially fails in the absence of an intrusion. The system automatically chooses and executes two different door-width sensing routines. A plurality of spaced apart transmitter stations mounted vertically apart in one door faces a plurality of spaced apart, receiver stations mounted in the other door. Each transmitter station periodically radiates modulated light towards the receivers in the opposite door. A main control circuit monitors all receivers, controls all the transmitters, and executes the software. The presence or absence of a Shepherd beam established diagonally between the doors determines whether the system executes a "long beam" pattern when the doors are far apart or a "short beam" pattern when the doors are closer together. Gate networks can be jumpered to variably configure the transmitters and receivers. The software adjusts for broken parts or semi-permanently interrupted beams by automatically marking out inoperative pathways, thus enabling the system to continue functioning with alternative beam sequences evolved on the job. Marked out beam are periodically re-established by the software. Diagnostic indicators monitor blocked beams to warn service personnel.

65 Claims, 12 Drawing Sheets

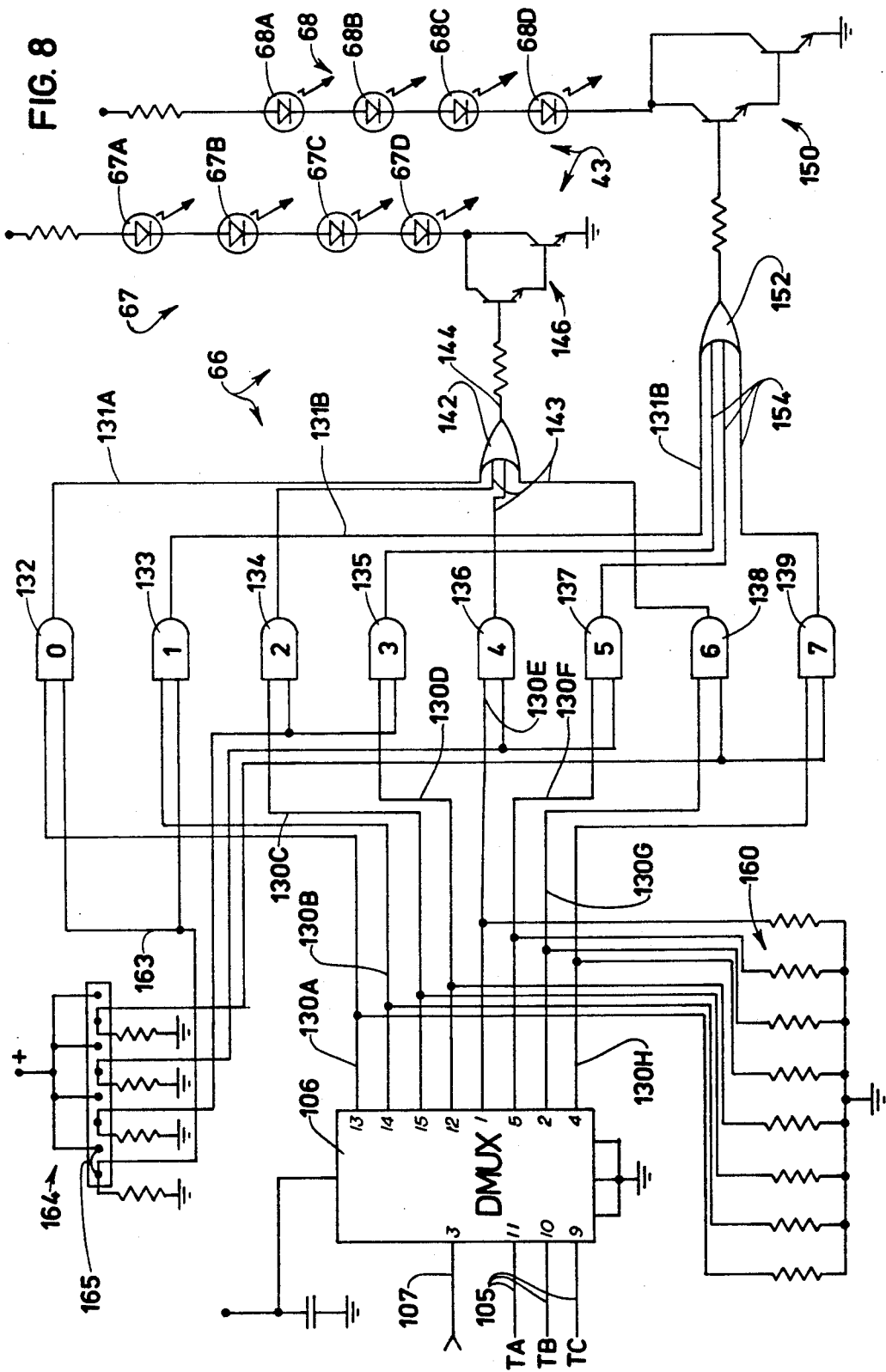

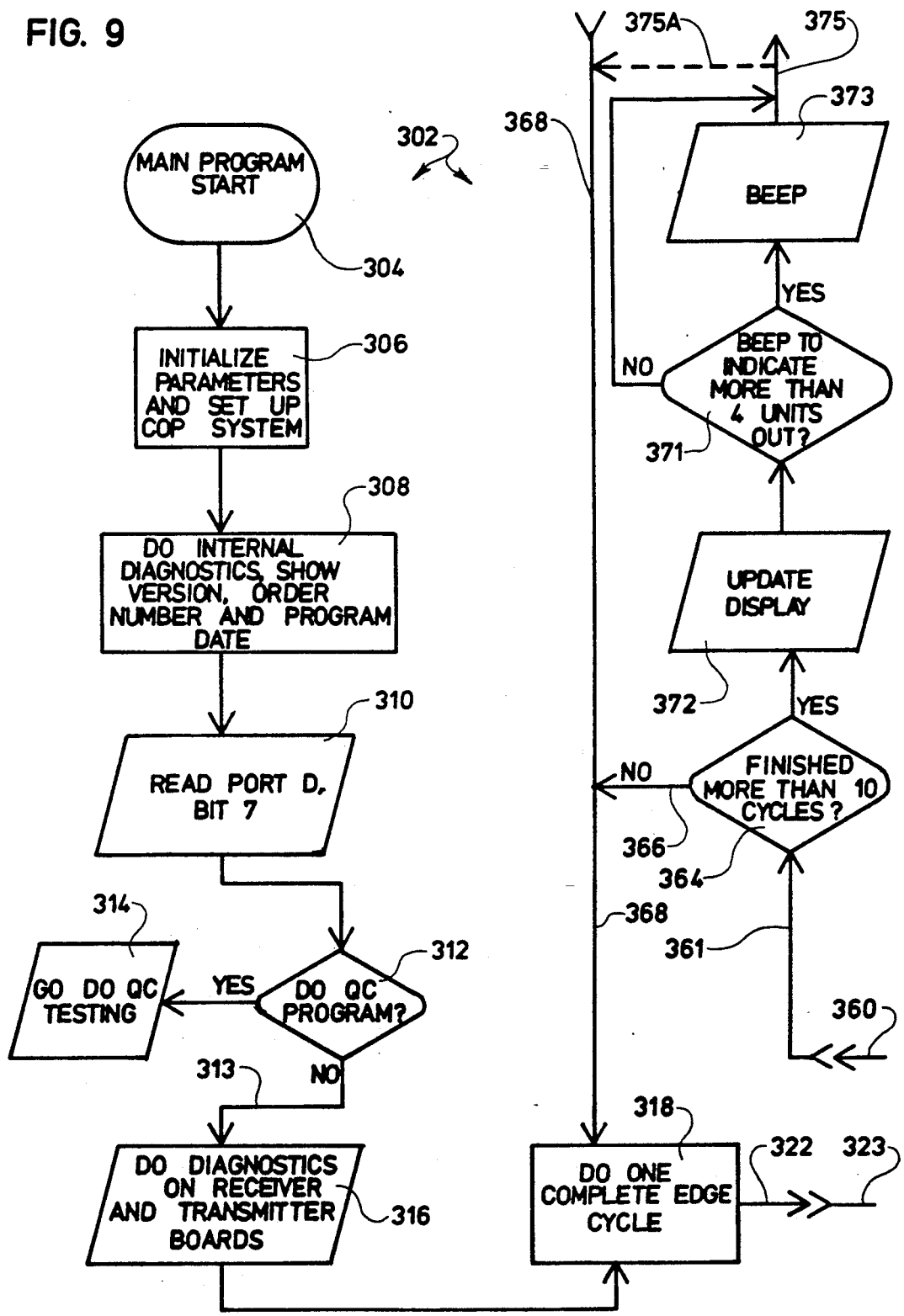

SELF CORRECTING INFRARED INTRUSION DETECTION SYSTEM

BACKGROUND OF THE INVENTION

This invention relates generally to intrusion detection devices. More particularly, my invention relates to an infrared sensing system for detecting the presence of objects between two areas being scanned. The invention is of particular importance to the elevator industry and is primarily designed for elevators.

In the prior art it has long been recognized to sense for intrusion within specified areas through various optical systems involving the establishment and detection of light pathways. There are many applications requiring sensing of the presence of objects or intrusions between structural areas. Automatic elevator doors, which automatically slide between opened and closed positions, are a prime example. Numerous attempts have been made in the prior art to make the doors "safe" and to provide reliable means for sensing the presence of passengers or obstacles between the doors. Numerous mechanical devices have been proposed for controlling the doors and withdrawing pressure in response to predetermined forces, and numerous systems for electrically monitoring doors have also been proposed. Reflected energy receivers are seen in U.S. Pat. No. 4,669,218. A simple gate operated in response to light beams is seen in U.S. Pat. No. 4,472,908, issued Sep. 25, 1984. This device controls a pair of swinging gates with a light path which may be broken by an intruder.

Trett U.S. Pat. No. 4,894,952 discloses a proximity detection system for sensing obstructions in the path of the door. An array of transmitter-receiver pairs transmit infrared energy downwardly in a confined space and looks for reflections to determine the presence of a passenger. In Glonet U.S. Pat. No. 4,914,859 a plurality of object presence sensing detectors involving ultrasonic transducers are placed along the pathway of a pair of elevator doors to sense for passengers.

Pronovost U.S. Pat. No. 3,746,863 discloses a switched network controlling a light curtain established between a pair of vertical members through which passengers may move. Pairs of receivers and transmitters alternate between the vertical points defining the gate, and means are provided for logically determining the presence or absence of an intruder. Haag U.S. Pat. No. 4,742,337 provides a system wherein light may be transmitted from a receiving transmitting strip towards an area to be monitored. Light is returned through the area from a reflective strip, and the absence of a return indicates the presence of an intruder.

Trett U.S. Pat. No. 4,910,464 issued Mar. 20, 1990 discloses a proximity detection system ideally for use with sliding elevator doors. An array of transmitter receiver pairs transmit energy across the doorway, expecting to receive a return reflection from the opposite doorway.

Scoville U.S. Pat. No. 3,852,592 discloses a door monitoring system involving infrared radiation which is broadcast in a detection zone immediately in front of the doorway. A three dimensional control zone is set up through scanning arrays, but the system is activated with reflective light. A photoelectric intruder device disclosed in U.S. Pat. No. 3,719,938 photoelectrically illuminates a particular area, and indicates an intrusion in response to predetermined reflection conditions.

Mills U.S. Pat. No. 4,029,176 discloses a proximity sensing system for elevator doors that transmits bursts of acoustic energy across the doorway to define a three dimensional sensing space. Timing intervals are employed to interpret reflected information.

U.S. Pat. No. 3,965,355 issued Jun. 22, 1976 discloses an infrared laser system which transmits light across a path to detect obstructions or intrusions.

Federmann U.S. Pat. No. 3,370,677 issued Feb. 27, 1968 discloses a proximity sensing system adapted to be disposed within sliding elevator doors. The field transmitted by the moving door is electrostatic, and in response to the variance of the field in response to an intruder or passenger, capacitance changes sensed by an analog circuit determine presence. Weber U.S. Pat. No. 4,266,124, Issued May 5, 1981 discloses a system wherein a plurality of infrared sources are strobed sequentially and transmitted across a space to be received by cooperating receivers.

One of the most relevant patents known to me is U.S. Pat. No. 4,794,248, issued Dec. 27, 1988. The latter reference discloses a system adapted to be employed on two sliding elevator doors. A plurality of infrared transmitters are disposed on vertically spaced apart locations on both doors. A receiving sensor is disposed on the top and bottom of each door, for sequentially monitoring radiation transmitted across the gap. The presence of an object in the pathway is detected when a radiant pathway is broken. The transmitters are energized sequentially. It is unclear how or what the logic circuit does, but the point is to try and detect intrusions by establishing and monitoring radiation pathways. Receivers and transmitters are not arranged in separate vertical columns as I have proposed, and no disclosure of a sophisticated digital logic sensing system is made in the latter reference.

U.S. Pat. No. 3,886,413 issued May 27, 1975 discloses a presence sensing system having a self checking diagnostic operation. The system provides indications of normal, intrusion, withdrawal conditions within guarded zone within a machine for safety purposes.

However, even in the case of reasonably sophisticated infrared sensing systems for use in the elevator arts, a number of problems remain. Slowness is a well known detriment. Also, infrared sensing devices of previous designs known to me have hitherto required repetitive servicing. As the elevator continues to be used various parts are subject to strain and normal wear and tear. Doors may often be subject to partially damaging collisions with hospital cars or the like, and sometimes critical parts are jarred out of alignment. Service calls and down time usually result. Moreover, because of the numerous ages and demeanors of people using elevators, and the frequency of vandalism, items of litter may randomly and periodically block pathways. It is not uncommon for gum and cigarette butts to be thrust into important radiation paths which can disable sensing equipment and necessitate a service call. Because of the relative simplicity of earlier elevator sensing systems, minor acts of vandalism aggravate down time and increase the necessity for service calls, much to the dismay and detriment of the building operators.

A significant weakness in earlier systems is that they do not automatically vary their radiation sensing patterns in response to semi-permanent mechanical blockage of beam pathways. In other words, when a preestablished sensing pathway is blocked, the circuit inflexibly indicates an intrusion, and the elevator doors are held open. The door sensing system can thus be sabotaged and rendered useless when a child places some gum on the wrong part of the door. If a system establishes redundant light pathways to reliably check for intrusions, it can reliably operate with less than all of its pathways operational. I have determined that the circuitry should actively modify its expected pathway sensing information to adjust itself to adapt for minor vandalism.

To speed up elevator operation I have found that it is extremely advantageous to vary the radiation pattern in accordance with the spacing of the doors. The logic must be able to differentiate between "wide" and "narrow" stances, and at the same time the logic must be capable of adequate diagnostics to please the service personnel. Moreover, in response to a mechanical change or blockage in the radiation pathway the system should be able to adapt and "learn" the new radiation patterns to operate properly without obstructing, delaying, or aggravating passengers. Whether sensing long or short distances, it must assume, determine, and operate under its new logic infrared sensing pattern.

SUMMARY OF THE INVENTION

My Self Correcting Infrared Intrusion Detection System installs within the sliding doors of conventional elevator cars. The system establishes a plurality of infrared sensing paths directed across the entrance way between the elevator doors for the detection of passengers who are entering or exiting the car. A series of software routines carefully monitor critical intrusion information. The entry space between the sliding doors varies in width in response to door movement, and the system automatically switches between software routines to execute two different sensing routines.

The system comprises a plurality of spaced apart transmitter boards mounted within a protective casing disposed vertically within one of the elevator doors. Each board has a pair of infrared transmitter stations comprised of a plurality of infrared LED's which radiate modulated, infrared light across the elevator car entrance towards the opposite door. A plurality of vertically spaced apart receiver boards are secured within a separate casing mounted vertically in the opposite door. Each receiver board comprises a pair of separate receiving stations for detecting properly modulated infrared light. A main control circuit monitors all receiver boards, controls all of the transmitter boards, and executes the software necessary for system operation.

Multiple beams of light are sequentially transmitted across the entrance way between specific transmitters and receivers. When a passenger (or other intrusion) enters the monitored region, one or more beams will be at least temporarily interrupted, and the circuit will normally pause or open the doors. The system logic is varied depending upon door position. A shepherd beam is established diagonally between the doors. The presence or absence of the Shepherd beam respectively determines whether the system executes a "long beam" sensing pattern or a "short beam" pattern. When the doors are open the widest, the long beam pattern is executed. When the doors are within approximately two feet of each other, the shepherd beam will no longer be sensed and the system logic switches to a more advantageous short beam pattern.

The main control circuit incorporates a four port, 8K, eight bit chip which includes its own internal watchdog circuitry for resetting the circuit when an improper software jump occurs. For addressing purposes one port controls all of the transmitter boards and all of the receiver boards. The preferred controller utilizes three bits of binary transmitter information for selection of the desired transmitter board and transmitter station. Similar logic also selects the receiver board or station to be sampled. A gate network is associated with each of the transmitter boards and receiver boards. Each transmitter board converts the three-bit binary address information to binary information outputted on eight separate address lines interconnected with an array of AND gates. Companion inputs of each of the AND gates are coupled to a user selectable jumper. Proper jumper selection will ultimately enable activation of a desired transmitter station. Similar gated logic an jumpering is employed in each receiver board so that a desired receiver station may be independently polled by the software.

The software looks for a shepherd beam to first determine which sensing pattern to run. If no shepherd beam is detected the system assumes the doors are closer than two feet apart, and a "short beam" pattern is executed. If the doors are widely spaced apart, a "long beam" pattern is executed. Each pattern sequentially activates the transmitter stations, and then polls specific receivers across the doorway. In either case not all receivers are expected to see all transmitters. Normally, when an intrusion is suspected because of interruption to a beam, the system opens the doors by closing or opening its electrical relays.

When normal operation is unexpectedly changed because of vandalism or part breakage, the software intelligently adjusts the circuit for different expected return signals from various receivers; I have employed unique blockage compensation routines for establishing this purpose. When, for example, a particular receiver station ceases to detect radiation because it has become obscured or damaged, then even though the system would normally expect to detect a through beam in the absence of an intrusion, the system will adjust itself to no longer require reception from that receiver. Similarly the system determines when one of its transmitter stations has become inoperative, and the software "marks out" that transmitter to adjust itself to operate without that particular transmitter. A new beam pattern follows, and the system continues to detect intrusions with a reduced number of beams. Redundancy of normal beam patterns insures reliability even if multiple beams are later marked out.

Even when beams are marked out, they may later be reactivated. If after a predetermined time interval certain "marked-out" beams are later detected by the system, the software will reinitiate those previously "marked out" beams, so when a temporary beam blockage (not established by an intrusion) ceases, the system will resume "normal" redundant operation by sensing with a full set of beams. The software can thus adjust itself to operate without certain "injured" hardware elements, and it will then resume checking for intrusions. Down time is thus reduced.

Thus a primary object of the present invention is to provide an infrared sensing system for elevator doors which will reliably and continuously detect passengers.

Another object of the present invention is to provide an infrared sensing system with active intelligence for adapting to structural and mechanical changes in its operating environment, and for automatically compensating for electro-mechanical problems.

A related object is thus to provide a "through beam" infrared sensing system for elevators, which does not suffer from the many limitations of prior art "proximity sensing" systems.

Another object is to provide an infrared sensing system of the character described which may be easily installed and serviced by technicians with minimum skills.

Another fundamental object of the present invention is to provide a passenger sensing system for elevators which will accurately and safely detect and respond to both fast moving traffic and slow moving traffic.

Yet another object is to provide an infrared sensing system of the character described which automatically switches beam sensing patterns according to door spacing.

Another fundamental object of the present invention is to provide an infrared sensing system for elevator doors which is ideally adapted for use in hospitals, homes for aged, and applications where small children may be involved.

A basic object of the present invention is to provide an advanced infrared detector system for elevator systems in which individual circuit boards can be jumpered for use in any desired mechanical position in either the receiving or transmitting arrays.

A related object is to reduce the number of repair parts which a technician must maintain in stock for proper maintenance of the system.

Still another object of the present invention is to provide an infrared sensing system of the character described, which, for maintenance purposes, requires the storage of relatively few parts in inventory. It is a feature of the invention that a single transmitter board (or a single receiver board) may be jumpered to respond to eight different digital addresses.

Another important object of the present invention is to provide an elevator infrared sensing system of the character described which can readily detect very small and quickly occurring intrusions.

Another object is to provide an infrared through beam system of the character described with automatic "blockage compensation," so that a semi-permanent blockage of an established light beam patter occurs, the circuitry is automatically adjusted to prevent that particular pattern from keeping the doors open any longer.

Another object is to provide a system characterized by integrated electronics and modularity, so that repairs are quicker and easier in the field.

Another basic object is to provide an infrared elevator door sensing system of the character described which may be repaired in the field without removing critical parts.

Yet another object is to provide a system of the character described whose microcode can be easily updated by the replacement of a simple chip.

Another basic object is to provide a self diagnostic routine for infrared sensors of the character described so that the serviceman or technician visiting the installation will readily be able to ascertain problems if they occur.

Another object of the invention is to provide a "chip operating properly" system which will automatically perform a hardware reset of the microprocessor in the event the software locks.

A still further fundamental object of the present invention is to provide a system which automatically switches between a long beam pattern and a short beam pattern.

Yet another object of the present invention is to provide an infrared sensing system of the character described with the ability to actively "learn" in response to changing environmental operating conditions. It is a feature of the present invention that it can automatically compensate for semi-permanently interrupted beam pathways brought about by wear upon parts or deposition of foreign objects (such as gum or the like) on critical structures.

A related object is to provide a system of the character describes which senses particular combinations of failures in the path between receivers and transmitters and adjusts its logic to compensate therefore.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 8 is an electrical schematic diagram of a preferred transmitter board;

FIG. 9 is a block diagram showing the main program;

DETAILED DESCRIPTION OF THE DRAWINGS

Figure 1:
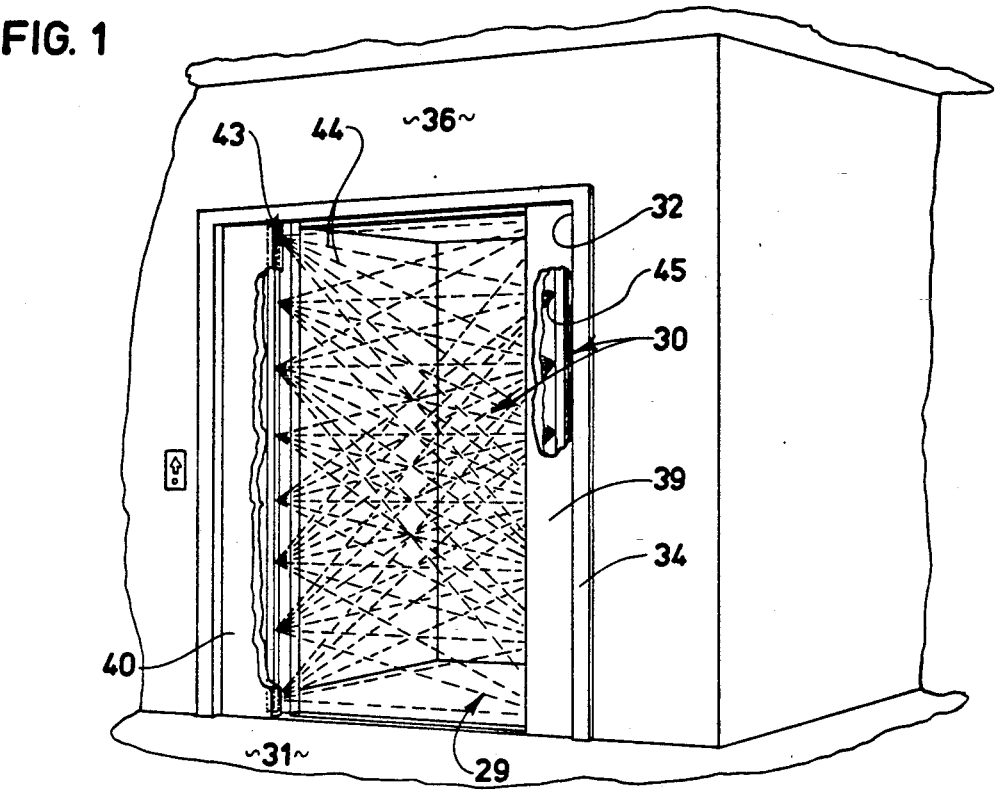
FIG. 1 is a fragmentary pictorial view of an elevator station with conventional sliding doors and an entryway, showing my Self Correcting Infrared Intrusion Detection System.
Figure 2:
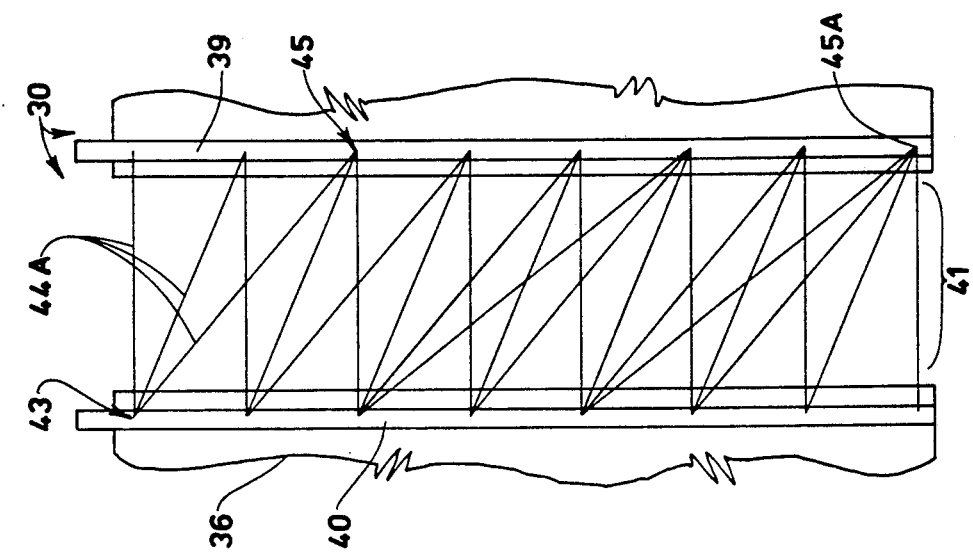
FIG. 2 is an enlarged, fragmentary, pictorial view showing the light beam paths preferably generated by my system when the elevator doors are relatively closely spaced together.
Figure 3:
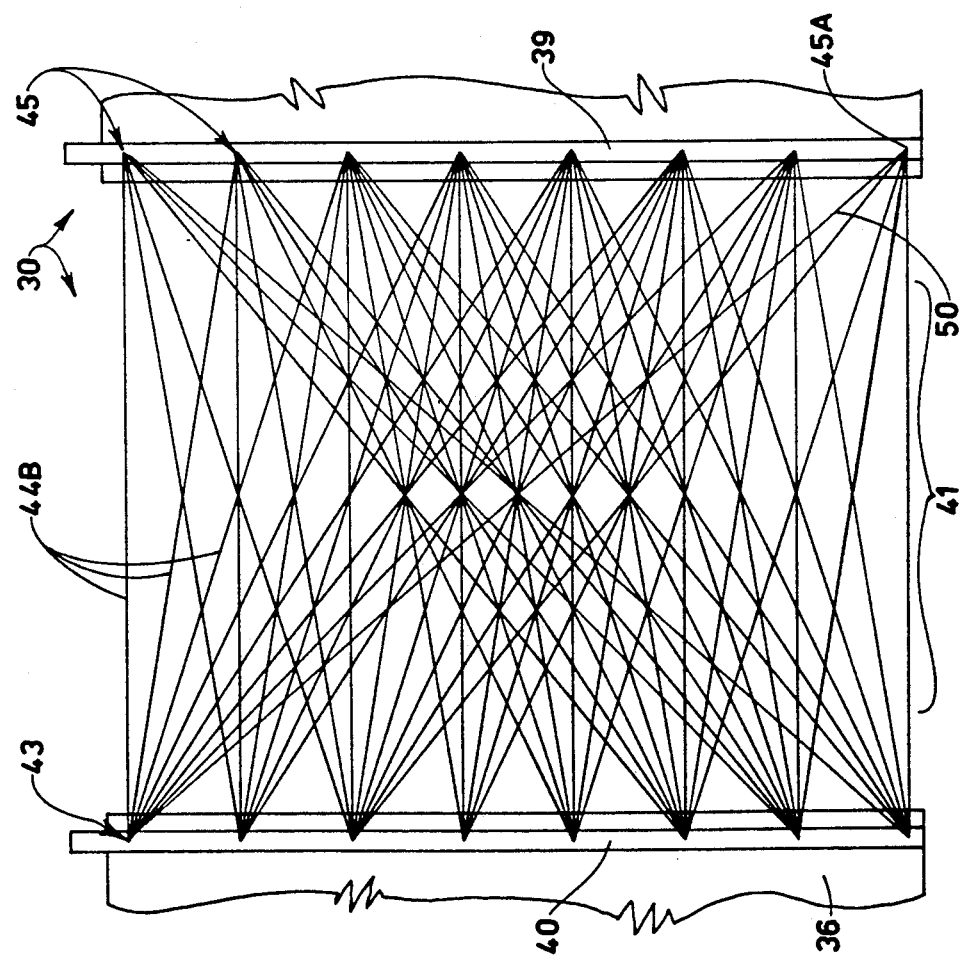
FIG. 3 is an enlarged, fragmentary, pictorial view illustrating preferred beam paths generated when the elevator doors are spaced widely apart.

With initial reference now directed to FIGS. 1-3 of the appended drawings, my Self Correcting Infrared Intrusion Detection System has been generally designated by the reference numeral 30. A conventional elevator car 29 adjacent floor 31 is exposed for ingress and egress by passengers who pass between the conventional sliding doors 39 and 40. These doors are mechanically actuated by conventional electromechanical apparatus of well known characteristics. Such apparatus may be triggered by external relay circuits of the type contemplated herein. System 30 is disposed within the doorway 32 formed within frame 34 defined in the typically brick facade 36 in a conventional building. It will be appreciated that the twin slidable doors 39, 40, are spaced apart within the doorway and may be opened or closed through mechanical linkages and actuators beyond the scope of this patent. The entry space 41, comprising a space between the doors that is to be monitored by the system, varies in width in response to door movement, and it must be traversed by passengers entering or exiting the elevator car. Space 41 is monitored by multiple "beams" established by system 30 that extend between the sliding doors, and as will be explained hereinafter, the width is monitored.

System 30 preferably comprises a plurality of infrared transmitter stations 43 mounted on separate circuit boards disposed in a casing disposed upon the recessed inner edge of a first door 40. The transmitter stations, which are vertically spaced apart within the door 40, radiate modulated, non-coherent infrared light across the elevator car entrance 41 toward the opposite sliding door 39. Door 39 receives a multiplicty of vertically spaced apart receiver stations also mounted on separate circuit boards disposed in a protective, recessed casing. Light is transmitted substantially throughout the entrance area 41, but specific pathways between specific transmitter and receiver stations are generally designated by the reference numeral 44, 44A, and/or 44B. These pathways may be referred to as "beams." When a passenger or other intrusion partially or completely enters the monitored region between the opposed doors 39, 40, one or more beams will be at least temporarily interrupted, and the apparatus to be described will pause or open the doors to prevent potentially injurious door contact with passengers. Of course it will be recognized that the transmitters could be disposed on either door and aimed in either direction. Transmitter stations 43 and receiver stations 45 will be shown in greater detail hereinafter. Each transmitter station comprises multiple LED's aimed generally across the doorway, and light from each LED will occupy a generally cone shaped projection field, illuminating most of the individual receiver stations 45 within doorway 39.

In FIG. 3 a Shepherd beam 50 extends diagonally between the doors towards the lowermost receiver station 45A on the opposite side. The presence or absence of this critical Shepherd beam determines whether system 30 transmits the "short beam" patterns 44A of FIG. 2, or the "long beam" patterns 44B of FIG. 3. When the doors are disposed furthest apart, the patterns seen in FIG. 3 are logically invoked by the system. Deviance from reception in the receiving network of these patterns will generally cause the doors to hesitate or open. When the doors close to within approximately two feet of each other, shepherd beam 50 will no longer be sensed by receiver station 45A at the opposite side of the diagonal, and the system logic switches to sense the "short beam" patterns of FIG. 2, establishing beams 44A. In other words, beam sensing patterns are changed by the system according to door spacing.

As will be explained in detail hereinafter, the main circuit is disposed upon a motherboard within a housing (not shown) adapted to be spaced apart from the several separate transmitter and receiver boards. The housing is externally secured upon the elevator car in a conventional manner. The motherboard circuitry 52 will be discussed later primarily in conjunction with an explanation of FIG. 6. Circuit 52 includes a plurality of LED indicators generally designated by the reference numerals 54 and 56 for designating to the service technician the state of particular receiver and transmitter stations on remote boards, as will be hereinafter explained.

Figure 4:
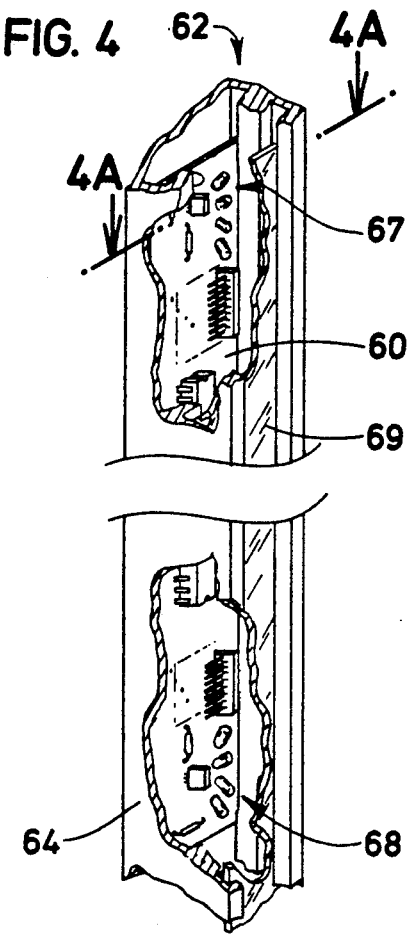
FIG. 4 is an enlarged, fragmentary isometric view of a transmitter board operationally mounted within an elevator door, with portions thereof shown in section or omitted for clarity, or broken away for brevity.
Figure 4A:
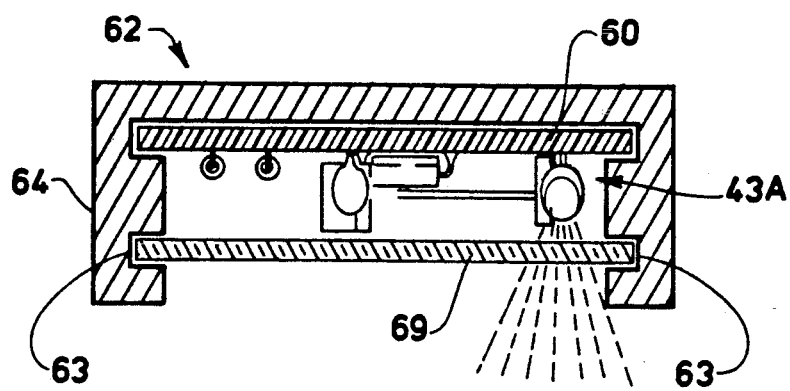
FIG. 4A is an enlarged, fragmentary sectional view of the transmitter circuit board and mounting casing taken generally along line 4A—4A of FIG. 4.

With additional reference directed now to FIGS. 4, 4A and 8, a typical transmitter circuit board has been generally designated by the reference numeral 60. Each printed circuit board 60 is secured by a mounting assembly 62 (FIG. 4A), whose exact configuration can vary. Board 60 is mounted beneath a Lexan TM cover plate 69. Plate 69 is substantially opaque at visible light wavelengths, but it is translucent at infrared frequencies. The circuit boards and plate 69 are preferably mounted between suitable channels 63 in extruded frame 64. It will also be appreciated that the various gates and chips seen in FIG. 8 are located on each transmitter board 60 (FIG. 4) and securely mounted within frame 64.

The LED arrays are driven by transmitter circuit 66 (FIG. 8). Each circuit board 60 comprises a pair of infrared transmitter stations 43A, each comprising arrays 67, 68 of multiple LED's that are spaced apart on board 60. Circuit 66 drives the LED arrays. A plurality of similar spaced apart circuit boards 60, all mounted within an elongated housing frame 64 (FIG. 4A), are disposed on the left side of the elevator door (FIG. 1). An array of multiple infrared LED's is mechanically indicated in FIG. 4A and electrically indicated in FIG. 8. In the best mode transmitting arrays 67, 68 each comprise four separate LED's arranged mechanically as best seen in FIG. 4A. LED's 67A-67D and 68A-68D (FIG. 8) are wired in series electrically, and mechanically they are radially spaced apart on the circuit board 60.

Figure 5:
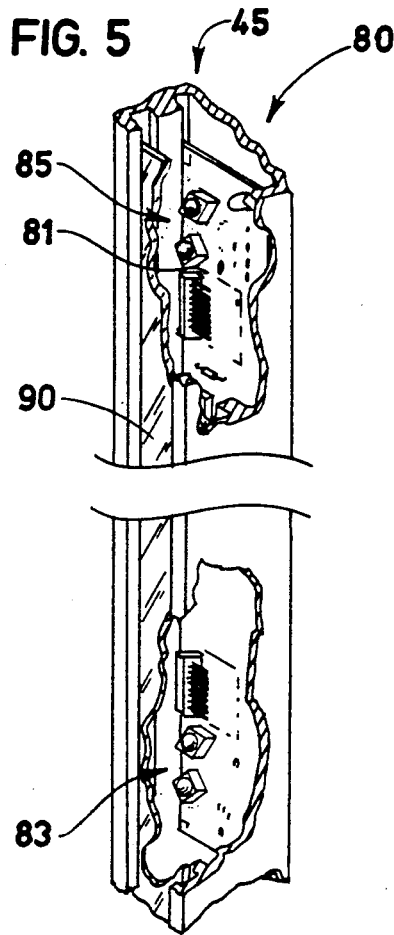
FIG. 5 is an enlarged, fragmentary isometric view of a preferred receiver board operationally mounted within an elevator door spaced apart from the door of FIG. 4, with portions thereof shown in section or omitted for clarity, or broken away for brevity.
Figure 7:
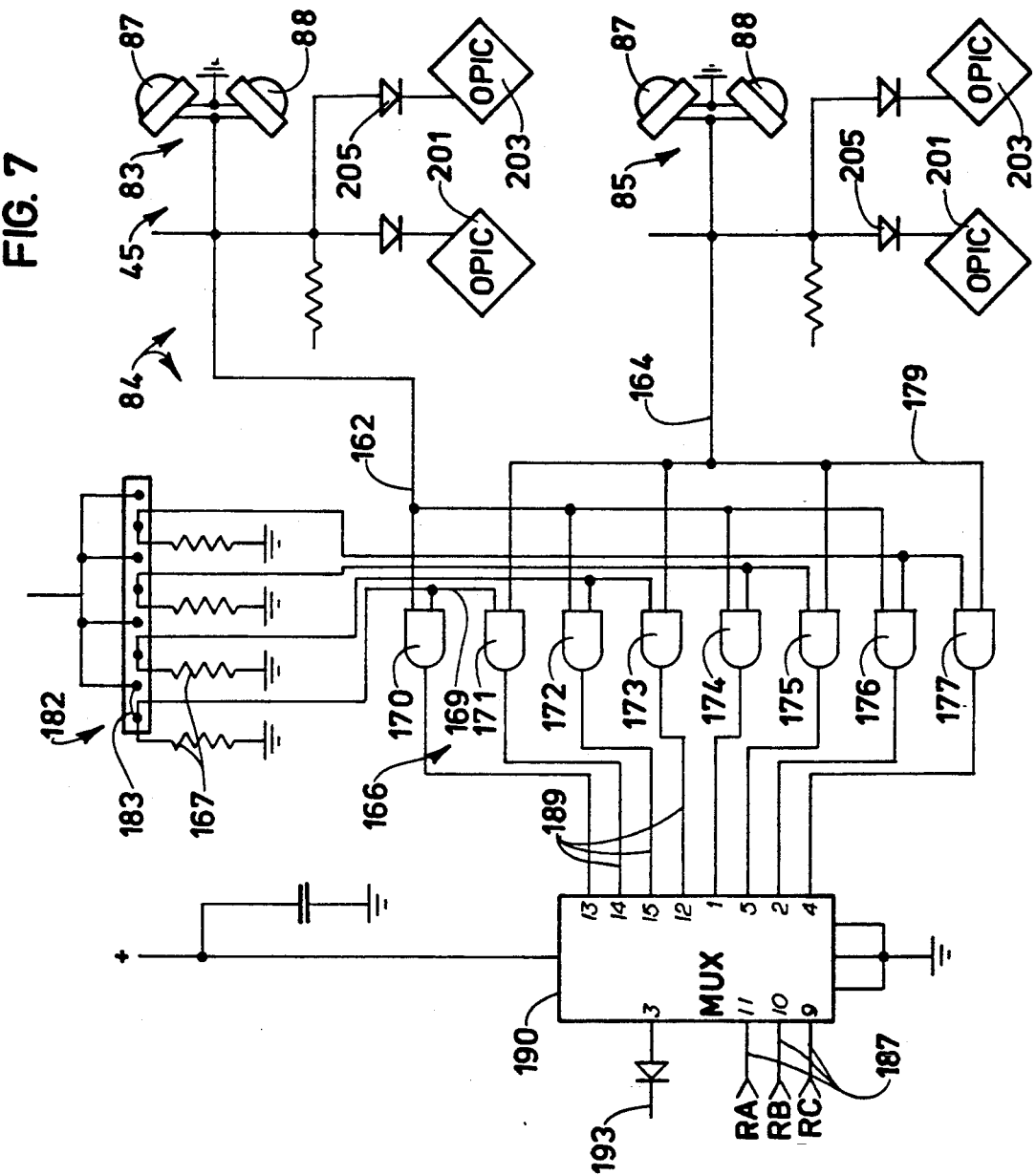
FIG. 7 is an electrical schematic diagram of a preferred receiver board.

With additional reference now directed to FIGS. 5 and 7, the cooperating receiving portion of my system includes a plurality of individual, spaced apart receiver boards 81 spaced apart in an elongated mounting assembly 80. Assembly 80 is similar mechanically to assembly 62 (FIG. 4A) and it is adapted to be disposed vertically within door 39 (FIG. 1). Each receiver circuit board 81 mounts the receiver board circuit 84 (FIG. 7) to be described hereinafter. The spaced apart receiver stations 45 associated with each receiver board may comprise a duet 83 of infrared responsive photo-sensitive transistors 87, 88 wired in parallel. Alternatively, each receiver station 45 may comprise two separate optical IC's 201, 203 (FIG. 7). The receiver circuit board 81 is held within an extruded casing (similar to frame 64 of FIG 4A) and disposed behind a Lexan TM cover plate 90 (FIG. 5). In the best mode four receiver boards and four transmitter boards are used in system 30.

Figure 6:
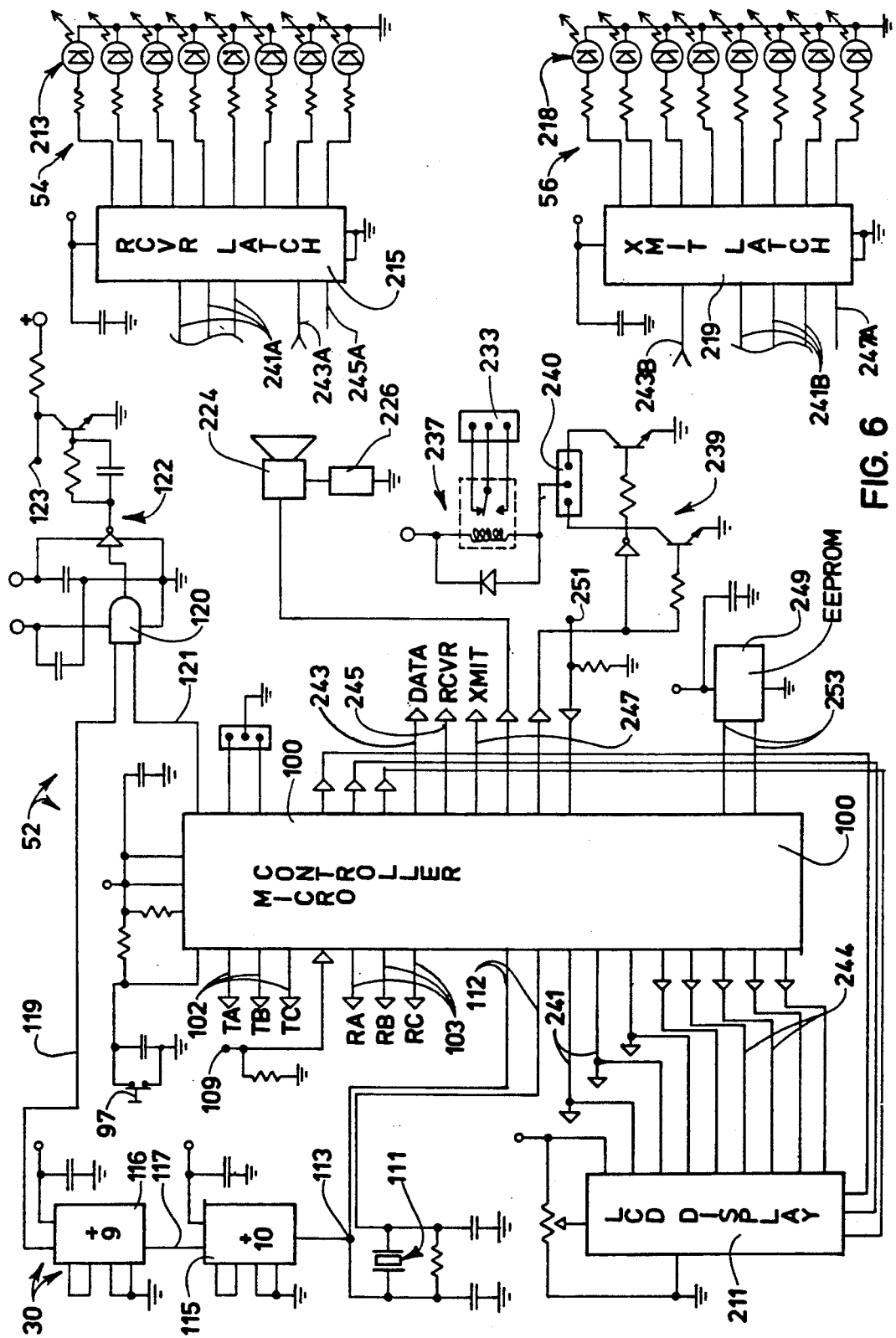
FIG. 6 is an electrical schematic view of the microcontroller and motherboard circuit.

With primary emphasis directed now to FIGS. 6-8, the main circuit 52 comprises a micro controller EPROM 100, which, in the best mode is a Motorola TM Model No. 68HC705C8P. This programmable read only chip is a four port, 8K, eight bit device which includes its own internal watchdog circuitry (COP). The COP circuit comprises a timer that must be periodically reset to zero during normal processor operation; if no reset occurs, the COP assumes an improper jump has taken place, and the main controller circuit is automatically reset. Circuit 52 can be manually reset with switch 97; reboot takes place within less than one second. For addressing purposes one micro-controller port controls all the transmitter boards and the circuits 66 (FIG. 8) therein, and all the receiver boards and their circuits 84 (FIG. 7). Two separate three bit digital control line groups are established for transmitter and receiver control. The software to be described hereinafter is burned into the chip through conventional techniques. The controller output bus lines 102 deliver three bits of binary transmitter information and are marked as TA, TB, and TC, each of which can be a logical zero or one. Lines 102 are connected to transmitter input lines 105 (FIG. 8) associated with each of the transmitter boards. This three-bit binary information leads to a 4051 multiplexer chip 106 (FIG 8) that functions as a demultiplexer (DMUX) and outputs binary data on its lines 130A-130H.

In FIG. 6 crystal oscillator 111 excites controller lines 112. Its output on node 113 is divided by ten by divider 115, which outputs on line 117 to divider 116, which divides by nine. The output on line 119 leads to AND gate 120, whose other line 121 leads to controller 100. Gate 120 outputs to driver circuit 122 (FIG. 6) which steps up the output from five to twelve volts and outputs clock signals (i.e. the approximately 40 khz. LED modulating frequency) on node 123. This clock signal is applied on line 107 to DMUX 106 (FIG. 8) to modulate the binary gate signals appearing on lines 130A-130H.

The transmitter board DMUX 106 (FIG. 8) converts the three-bit binary address information appearing on lines 105 to binary information outputted on eight separate address lines 130A-130H that are respectively interconnected with AND gate 132-139. These gates are part of a single 4081 chip. The outputs of AND gates 132, 134, 136 and 138 are transmitted to OR gate 142, whose output on line 144 is transmitted to a Darlington driver 146 to energize the LED array 67 previously discussed. Similarly, LED transmitter array 68 is controlled by a Darlington driver 150 driven by OR gate 152 whose input lines 154 are connected to the outputs of AND gates 133, 135, 137, and 139. Each of the AND gates 132-139 are wired in parallel with SIPP pull down load resistors 160. Companion inputs of each of the AND gates 132-139 are coupled to a jumper array 164 having a user selectable jumper 165. Proper jumper selection will ultimately enable activation of the desired transmitter LED array 67 or 68 only in response to either of a pair of three digit binary numbers appearing on lines 105. TA, TB, and TC can be either high or low depending upon the three digit binary number requested, which can be 000 to 111. With this design one transmitter board will respond to two separate sequential digital three bit addresses; four boards so addressed on a common bus can thus respond to eight separate transmitter station addresses.

OR gates 142 or 152 (FIG. 8) activate the transmitter arrays 67 or 68 in response to a signal on any of the gate input lines 143 or 154 respectively. Such a signal can only appear if particular AND gates 132-139 are addressed. With jumper 165 connected as shown, node 163 and one of the inputs to gates AND 132 and 133 will be held high. If a logical 000 appears on DMUX lines 105, line 130A from DMUX pin 13 will transmit a 40 khz. pulsed signal to AND gate 132, whose companion input is held high by the jumper 165. Output line 131A will strobe OR gate 142, in turn activating transmitter station LED's 67A-67D with Darlington driver 146. With jumper 165 disposed as in FIG. 8, LED transmitter array 67 is activated in response to the binary number 000 on lines 105. Transmitter array 68 is turned on when lines 105 present a binary 001 (i.e. TA=1 or "on," TB=0, and TC=0) and DMUX pin 14 applies a 40 khz. square wave to activate AND gate 133, one input of which is held high by node 163. Then line 131B activates OR gate 152 to turn on Darlington driver 150 and thus LED's 68A-68D. In either case the 40 kHz line to DMUX pin 3 will be transmitted though the logic to the transmitter LED's. As will be explained hereinafter, the receiving circuits (FIG. 7) which are also controlled by the controller 100 (FIG. 6) will be immunized from ambient noise and reflected light since they will not respond unless the 40 kHz modulation applied to the transmitting LED's is detected.

With primary reference now directed to FIG. 7, the receiver stations may comprise either an array of photosensitive transistors 87, 88 wired in parallel as shown, or an individual array of optical IC's 201, 203. Suitable phototransistors are model 1U521Y detector units. In the best mode integrated optical IC's comprising Opic Sensor model IS1U60 are employed. These provide either a digital "0" or "1" output on lines 162, 164; each includes an integrated circuit having an amplifier, a limiter, a band pass filter, demodulator and comparator specially designed for optical infrared sensing. The IC "goes low" when it "sees" modulated light from any of the transmitters. Each optical IC preferably comprises a GP1U521Y integrated circuit package connected to lines 162 or 164 via an isolating diode 205.

Lines 162, 164 (FIG. 7) lead to a plurality of gates generally designated by the reference numeral 166, comprising AND gates 170-177. Outputs from the AND gates 170-177 appearing on lines 189 lead to another 4051 multiplexer (MUX) 190. MUX 190 responds to binary signals RA, RB and RC on its lines 187 that connect to bus lines 103 in controller 100 (FIG. 6). An output on line 193 (FIG. 7) is either high or low depending on whether a 40 kHz modulated signal has been properly received at the time by the correctly addressed receiver station 45. Gates 170, 172, 174 and 176 have one input tied to the receiver circuit through line 162. Gates 171, 173, 175 and 177 are tied to the other receiver circuit through lines 164 and 179. Companion inputs to gates 170-177 are provided by the pull down resistors 167 wired to a user programmable jumper network generally designated by the reference numeral 182. Jumper network 182 can be programmed by moving jumper 183 so that the receiver data will be read by the controller 100 only when specific binary request signals appear on lines 187. For example, "on" or "off" receiver data from receiver duets 83, 85 will be available from MUX 190 on line 193 if a particular three digit binary code requested on lines 187 from MUX 190 "corresponds" to the jumper setting. In other words, the receiver data from this particular card (four are used, only one is shown) will not be read by the controller 100 (FIG. 6) unless the binary request made on MUX lines 187 (FIG. 7) are appropriate. With the jumper 183 connected as shown, the receiver data will be sampled responsive to binary requests on lines 187 for the numbers 000 or 001 (i.e. RA-RC reading either 000 or 001). When this occurs pins 13 and 14 of MUX 190 will be responsive to gates 170 and 171 respectively. These gates will transmit information from the respective receivers (i.e. lines 162 or 164) only if jumpered as shown, so that their companion input lines 169 are held high by jumper 183.

When properly configured the jumper 182 allows an individual circuit board to be used in any desired position in the receiving array. By jumpering properly that board may be quickly configured for mounting in positions one through four in the receiving side of the network. Thus a repairman, for example, need stock only one receiver board to replace any defective board in an inoperative system, since he can jumper the address as desired.

Important information regarding reception on line 193 (FIG. 7) is transmitted to the receiver logic in the controller 100 on node 109. As will hereinafter be explained, transmitter stations are selected electronically at given times through software to be hereinafter described, and the software also controls which of the receiver stations should be looking for a signal at that time. The software also performs diagnostic functions to be hereinafter described, which are displayed on the Sharp-brand LCD display network 211 (FIG. 6) and whose diagnostics are controlled by controller 100. The LCD display 211 includes its own logic.

As different receiver and/or transmitter stations are activated by the software during a beam sensing step, a separate LED display is provided by the motherboard circuit 52 for diagnostic purposes. A plurality of indicator LED's generally indicated by the reference numeral 213 (FIG. 6), controlled by a 4099 latching multiplexer chip 215, indicate when particular remote receiver IC's or phototransistors have been sampled or blocked out. LED's 213 and 218 are mechanically located on the controller unit for inspection by the technician. Latches 215 and 219 are preferably provided by a Motorola TM MC14099BCP. Latch block 219 drives a plurality of transmitter indicating LED's 218, which can be observed to determine when a given transmitter array is activated. Lines 241 (FIG. 6) emanating from controller 100 address the two latches 215, 219; they are connected to lines 241A and to lines 241B on latches 215, 219 respectively. Similarly data lines 243 are connected to latch input lines 243A and 243B. Receiver line 245 is connected to the receiver latch circuit 215 on line 245A; transmitter line 247 connects to transmitter latch 219 on line 247A.

In accordance with diagnostic software to be hereinafter described, the buzzer 224 (FIG. 6) can be used in conjunction with a programmable jack 226. The logic output for controlling driver motors in the conventional mechanical elevator door controller is transmitted to a terminal block 233 that controls conventional relay system 237. The relay field can be operated through drivers 239 interconnected with a terminal block 240. The LCD display logic 211 contains its own software for providing LCD display information transmitted to it on lines 244 from the controller 100. Blocks 240 and 233 can be configured as necessary so that the relay circuit either energizes or does not energize (i.e. either opens or closes its contacts). The logic provides the end user with a pair of contacts which may be normally closed or normally open depending upon the application. An optional EEPROM 249, preferably comprising a Zycor TM Model X24C16 is connected to micro controller 100 on lines 253.

Figure 9A:
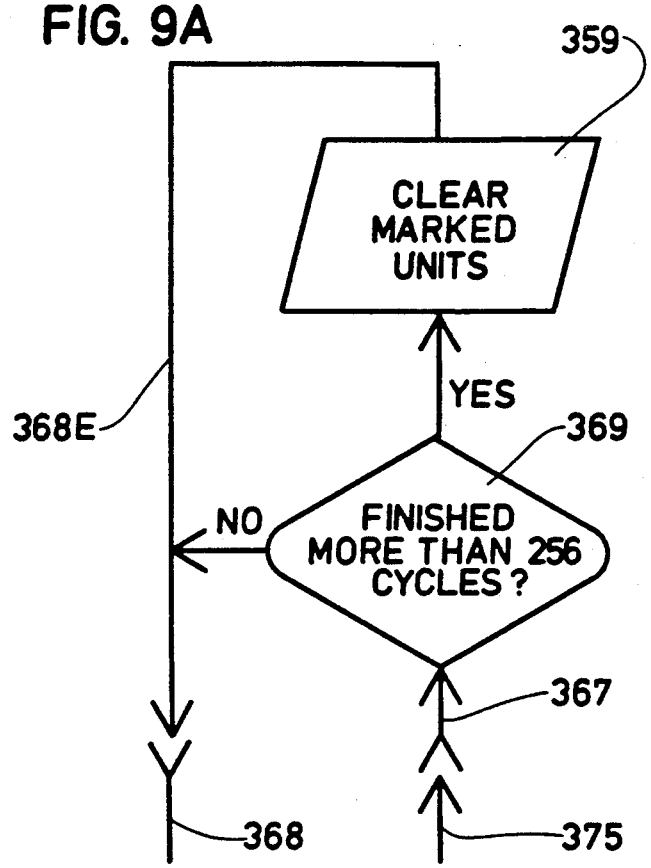
FIG. 9A is a block diagram of an optional mark-out reset loop used in conjunction with the logic of FIG. 9.
Figure 9B:
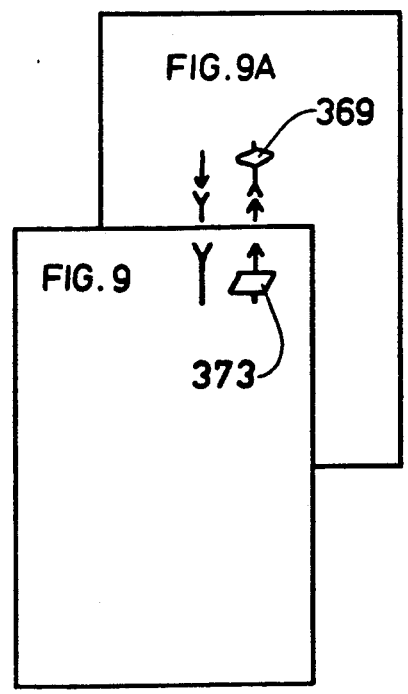
FIG. 9B is a diagrammatic view illustrating how FIGS. 9 and 9A should be oriented for viewing.

With respect to the software, and with initial reference to FIG. 9, it is first important to realize that not all receivers are designed to always see all transmitters. Moreover it is important to realize that while one transmitter is "on," various receivers are independently polled according to software to determine whether or not a responsive signal has been verified. When a signal should occur but does not, then it is normal for the system to open the doors by closing or opening appropriate relays 233 or 240 (FIG. 6). When, on the other hand, normal operation is unexpectedly changed because of vandalism or part breakage, the software to be described intelligently allows the circuit to automatically adjust itself for different expected return signals from various receivers. In other words, if a particular receiver station ceases to detect radiation because it has become obscured or damaged, then even though it would normally expect to receive a modulated signal in the absence of an intrusion, the system will adjust itself to no longer require that reception, and the software will assume that there is no intrusion between the doors.

In order for the unit to function most reliably I have determined that it is important to have two different reception and transmission patterns. The first pattern occurs when the doors are relatively far apart. In this case forty three "beams" are preferably established. As the doors get closer together the number of beams or pathways which can be sampled to reliably indicate intrusion are reduced to approximately twenty three. This occurs because the mounting angle of specific transmitter LED's and receiver sensors given the close door spacing is inappropriate for the establishment of a proper beam path. For example, the top transmitter station will not be sensed by the lowermost receiver station across the entry way when the doors are approximately within two feet of each other. Similarly the uppermost receiver on one side will not pick up the transmitters from the lower part of the other door and the closer the doors become the fewer extremely diagonal opposite beans connect and fewer pairs of transmitters and receivers function with one another.

Nominally the point where the beam patterns ar changed through the software is adjusted to two feet. This occurs when the transmitter all the way up on the top left fails to excite the bottom receiver on the other side (FIG. 1). The presence or absence of the shepherd beam 50 (FIG. 3) transmitted diagonally across the elevator car entrance is one factor indicating when the pattern should change between those illustrated in FIGS. 2 and 3. In the long beam pattern of FIG. 3 we have approximately forty-three "beams" or light pathways established and checked by the system. The "short beam" pattern seen in FIG. 2 involves only approximately twenty-three monitored pathways.

In FIG. 9, the main program has been broadly designated by reference numeral 302. When starting occurs at 304 initialization follows as indicated by box 306. During this phase of hardware energization the controller 100 will exercise its COP routine to remedy prolonged system lockup. The COP includes a clock that, as long as the program is running properly, will be periodically reset. If the program jumps outside the main loop (i.e. the main loop of FIG. 9), or if it locks itself out and does not reset the clock anymore, the COP will automatically reset the microprocessor 100 when it runs down. Normally the COP will not reset and box 308 will be triggered and the software will perform initial diagnostics, display its version number on the LCD display 211 (FIG. 6) and look for verification as indicated by step 310 (FIG. 9) by reading port D, bit 7; this corresponds in the hardware to node 251 in FIG. 6. Node 251 is a test point used only at the factory to test quality control in accordance with an alternative quality control program stored by micro controller 100. Step 312 (FIG. 9) facilitates the choice of implementing proprietary factory diagnostics in step 314. Thus quality control testing routine 314 will only occur at the factory when node 251 (FIG. 6) is placed high, corresponding to the choice "yes" in box 314 (FIG. 9). Where the choice is "no," as will usually be the case in the field, diagnostics on individual receiver and transmitter boards will be initiated through path 313 resulting in the normal software step 316. When the diagnostic routine is finished one complete edge cycle will be demanded by box 318 (FIG. 9). One complete edge cycle involves the turning on of a particular transmitter, the checking of a certain number of receivers with that transmitter on, the activation of a subsequent transmitter, the polling of its receivers, and so on.

As used herein the term "edge cycle" refers to the complete energization of all transmitters in either the short beam or long beam pattern and the sampling of the indicated receivers. Whenever an edge cycle is triggered, subroutine 300 (FIG. 10) will be initiated. Lines 322 and 323 (FIGS. 9, 10) indicate activation of the initial Shepherd beam check step 319. The "Check shepherd beam" choice determines whether or not the elevator doors 39 or 40 (FIG. 1) are the chosen distance apart, by attempting to sense for the shepherd beam 50 (FIG. 3). In the preferred embodiment the spacing is nominally two feet. A decision indicated by box 321 (FIG. 10) will be made: if the doors are within two feet of each other short beam logic is selected as indicated by box 324, which represents FIG. 11. If decision box 321 indicates that the doors are not within two feet of each other, the long beam logic is performed as indicated by box 372 leading to box 329 (FIG. 10), and the software sequence of FIGS. 12 and 13 follows. Boxes 329 and 331 in FIG. 10 illustrate diagrammatically how FIGS. 12 and 13 (i.e. the "long beam" logic) should be aligned for viewing.

Figure 10:
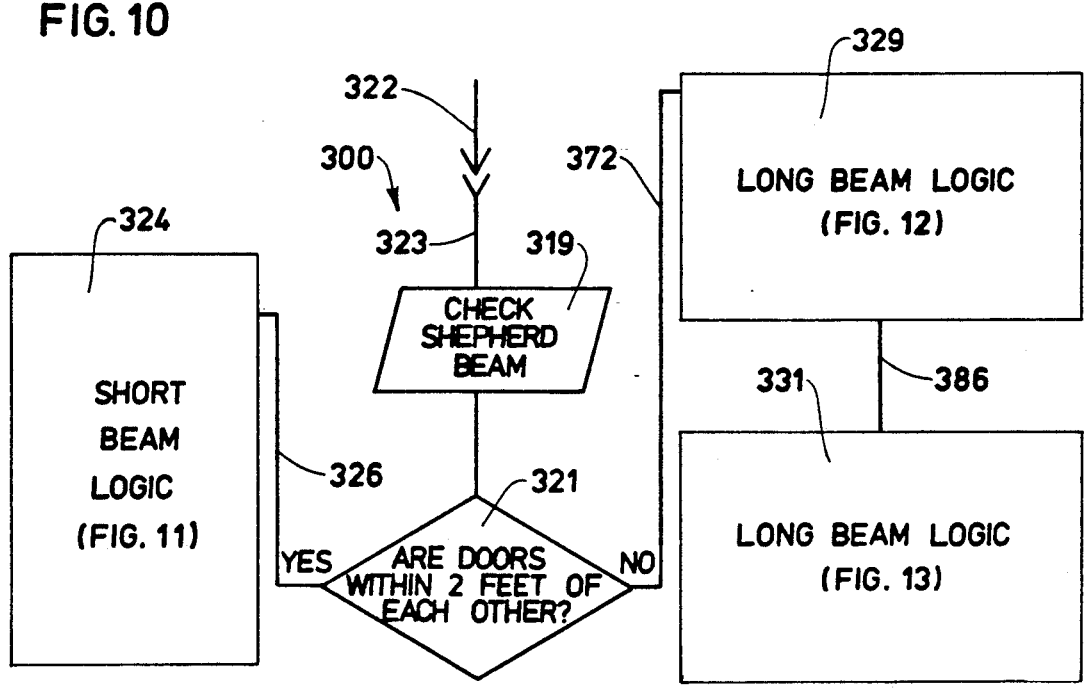
FIG. 10 is a block diagram of the software logic routine for edge cycle initiation.
Figure 11:
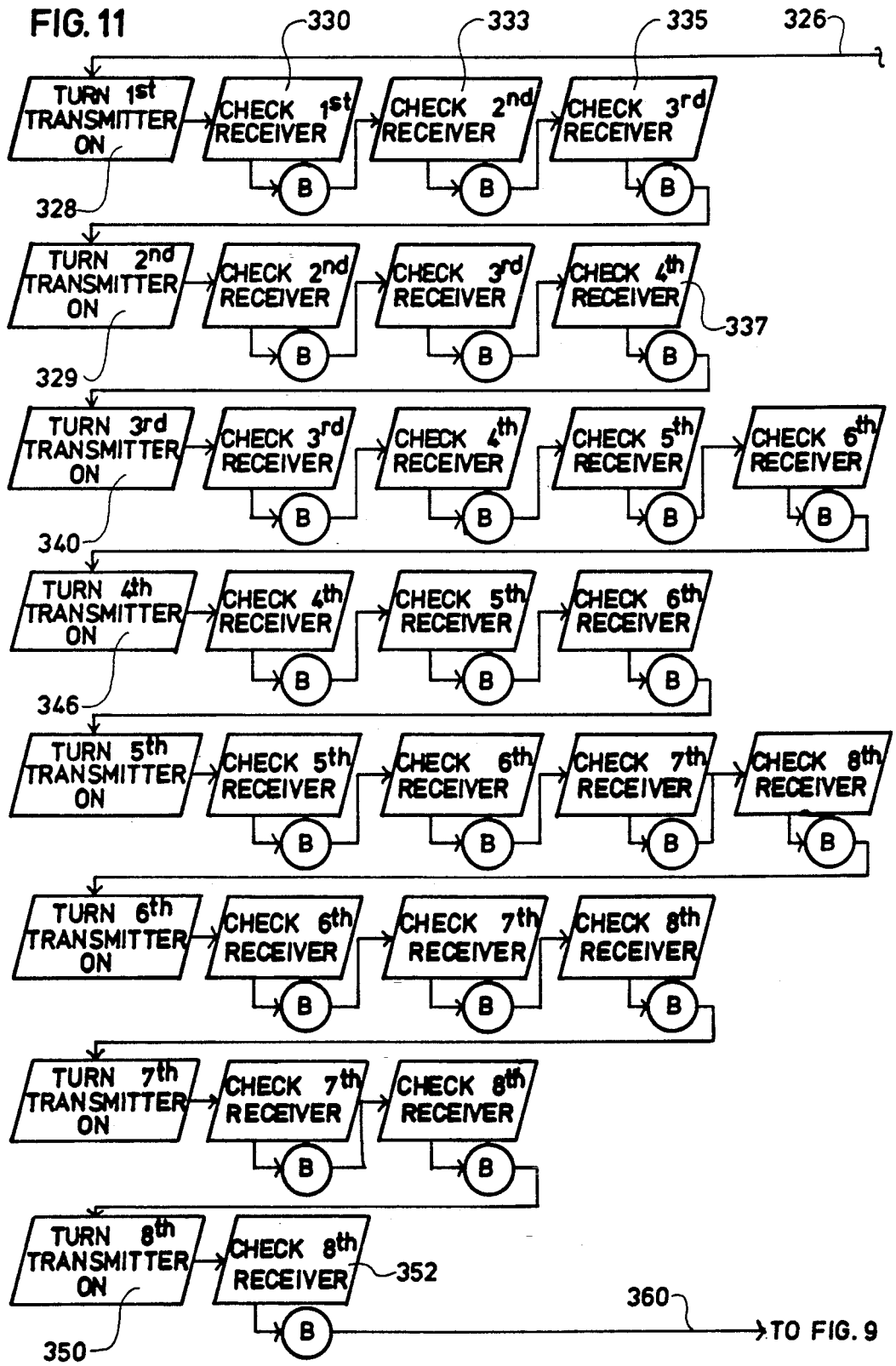
FIG. 11 is a software block diagram illustrating the transmitter and receiver control logic preferably implemented when the doors are within two feet of each other.

The logic flow from FIG. 10 to the "short beam logic" of FIG. 11 is represented by line 326. The object is to sequentially turn on particular transmitter stations in the respective transmitter boards, and then to attempt to sense radiation from that transmitter station across the doorway with separately, sequentially sampled receiver stations. The first transmitter select step of box 328 (FIG. 11) may initiate infrared transmitter array 67, and the second transmitter step of box 329 initiates infrared transmitter array 68 (FIGS. 4, 8).

In FIG. 11 the first transmitter is turned on in step 328, and then the first receiver on the opposite side of the doorway is checked as indicated by box 330. Each time a receiver is checked individual photo-sensitive sensors such as transistor duets 83 or 85 (FIG. 7) are addressed and polled. If a proper signal is determined by subroutine B (FIG. 14), then a second receiver is checked as indicated by box 333, followed by a third indicated by box 335. Each time a receiver is checked sub-routine B is executed. After receiver-check steps 330, 333, and 335 are properly sequentially executed, another cycle follows. A second "check transmitter" step 329 will then be executed, followed by three more "check receiver" steps with three more executions of subroutine B. After the "check fourth receiver" step 337 is executed, then a third transmitter will be turned on as indicated by box 340, which follows with checking of the third through sixth receivers. In this step the upper LED's associated with the second transmitter board will be activated. The first and second receivers ar not checked in this loop because when the doors are closer together, those transmitters that are closer to the center of the door are unlikely to illuminate the extreme receivers and are more likely to illuminate the "middle" receivers. The fourth transmitter is then activated as indicated by box 346 and the process continues until the eighth transmitter is checked as indicated by box 350, and if the eighth receiver receives it as indicated by box 352 a return is generated on line 360 coupled to line 361 (FIG. 9) which increments a count in step 364. If less than ten complete cycles (i.e. complete performances of the logic of either FIGS. 11 or 12/13) have not been performed, the cycle is repeated as indicated schematically by return lines 366 and 368. When ten complete implementations of either the long beam or short beam software are completed, the LCD display 211 is updated as indicated by box 372. The display updates trigger a response in the controller (FIG. 6) so that LCD display 211 is updated.

As will be explained hereinafter, sub-routine B (FIGS. 14) comprises special logic to effectively "mark out" certain receiver stations and/or transmitter stations when they appear no longer to be operational. In other words, where an expected beam pathway is obstructed for too long, the system assumes that pathway to have been interrupted by something other than an intrusion, and the software modifies the sensing routines to ignore that pathway and continue operation by checking the apparently-working beams. Sub-routine B includes active learning steps to temporarily modify the software routine to continue operating the elevator doors without requiring confirmation of "marked out" receiver-transmitter beams. The "marking out" of certain transmitter or receiver stations effectively reduces the number of beams that the system will continue to monitor. Marked out transmitters or receivers may have simply burned out, they may have been blocked by mechanical deformation or breakdown in equipment, or they may have been interrupted by an act of vandalism. In FIG. 9 diagnostic step 371, which includes a counter step, is included to activate beeping step 373 if too many transmitter arrays or receiver arrays are blocked out. Subroutine B determines when something is not responding, and increments the counter in step 371. Line 375A optionally leading to line 368 indicates a return to the complete edge cycle step 318, which then returns to circuit 300 of FIG. 10. In the best mode however, line 375 (FIG. 9) leads to line 367 (FIG. 9A) so that the system decides in counter step 369 if a preselected number of cycles have been completed. If, in the preferred embodiment, 256 cycles have occurred, step 359 clears marked units, and the cycle repeats on lines 368E and 368. Assuming now that the doors have opened wider, circuit 300 will determine the presence of a shepherd beam in step 319. This indicates that decision step 321 (FIG. 10) will switch to the long beam logic as indicated by line 372. When long beam logic is activated, the routine will be similar to the short beam logic (FIG. 11) already described, but many more receivers will be used in conjunction with the sampling of each transmitter, as seen in FIGS. 12 and 13.

Figure 12:
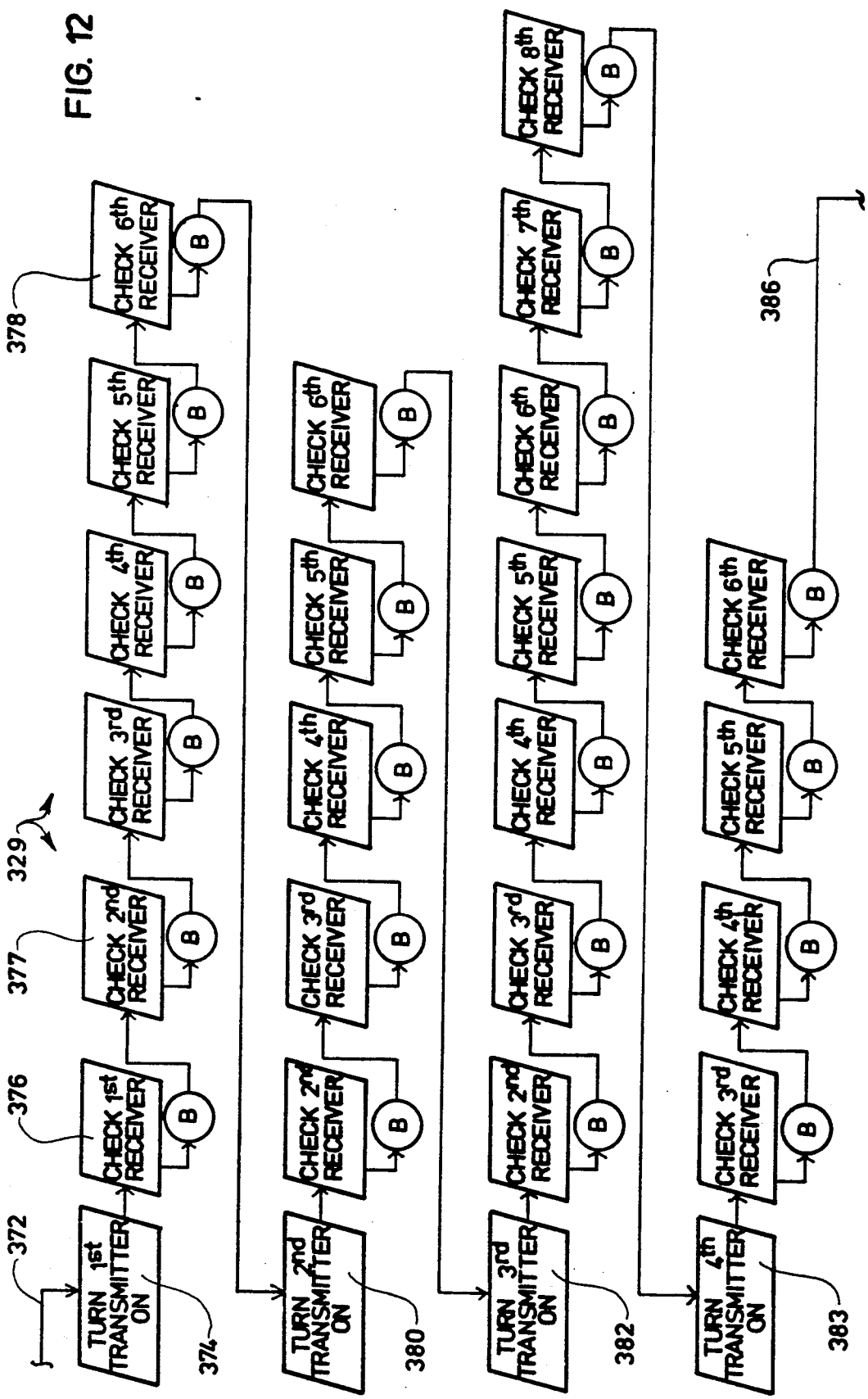
FIGS. 12 and 13 are block diagrams illustrating transmitter and receiver control logic when the doors are spaced apart greater than two feet from each other; and, FIG. 14 is a block diagram illustrating critical computer subroutine invoked during execution of the software of FIGS. 9-13.
Figure 13:
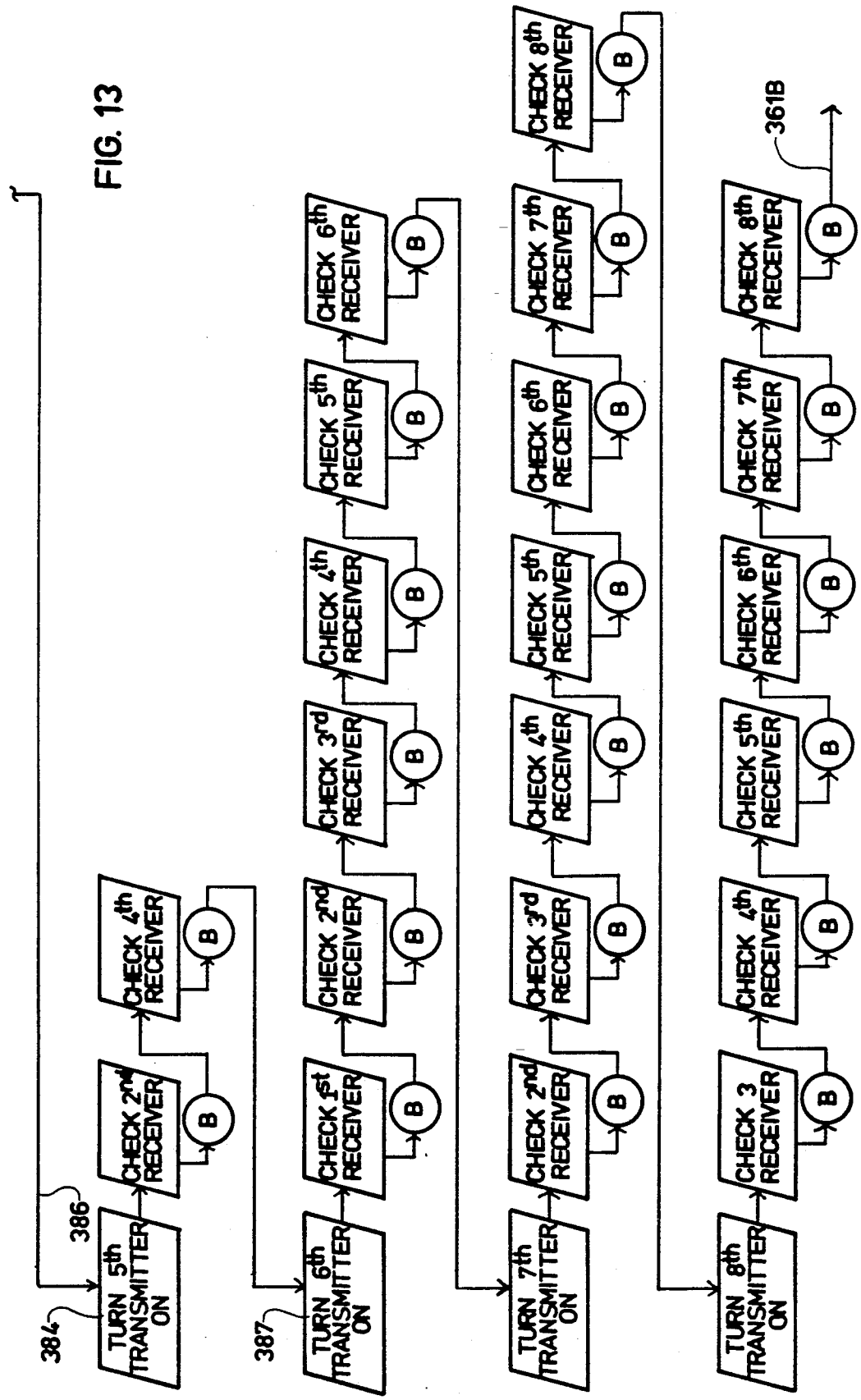

With joint reference to FIGS. 12 and 13, line 372 indicates that the first transmitter will be turned on in step 374. The first receiver will then be activated in step 376, sub-routine B will be executed and various subsequent receivers will be sequentially checked as indicated. After the sixth receiver is checked in step 378, step 380 will activate the second transmitter, whereupon the second through sixth receivers will be activated as before. When the third transmitter is turned on in step 382, the second through eighth receivers will be sampled. Illumination of a greater number of receivers is more likely with that transmitter board closer to the middle of the doors. After the fourth transmitter is sequentially activated in step 383, and the third through sixth receivers are polled, step 384 (FIG. 13) will follow as indicated by line 386, and the second and fourth receivers will be polled. Afterwards the sixth transmitter will be turned on as indicated by step 387, along with polling of the first through sixth receivers. Similarly, the seventh and eight transmitters will be activated as indicated, and the long beam logic will be completed as indicated by line 361B (FIG. 13) which returns to line 360 (FIG. 9). As indicated in FIG. 9, the loop will be repeated ten times by step 364, and the display will be updated. The cycle will continue in the loop, each time involving the logic of FIGS. 9 and 10, the short beam check of either FIG. 11, or the long beam routine of the combination of FIGS. 12 and 13. In each receiver checking step of FIGS. 11-13 sub-routine B (FIG. 14) is implemented.

Figure 14:
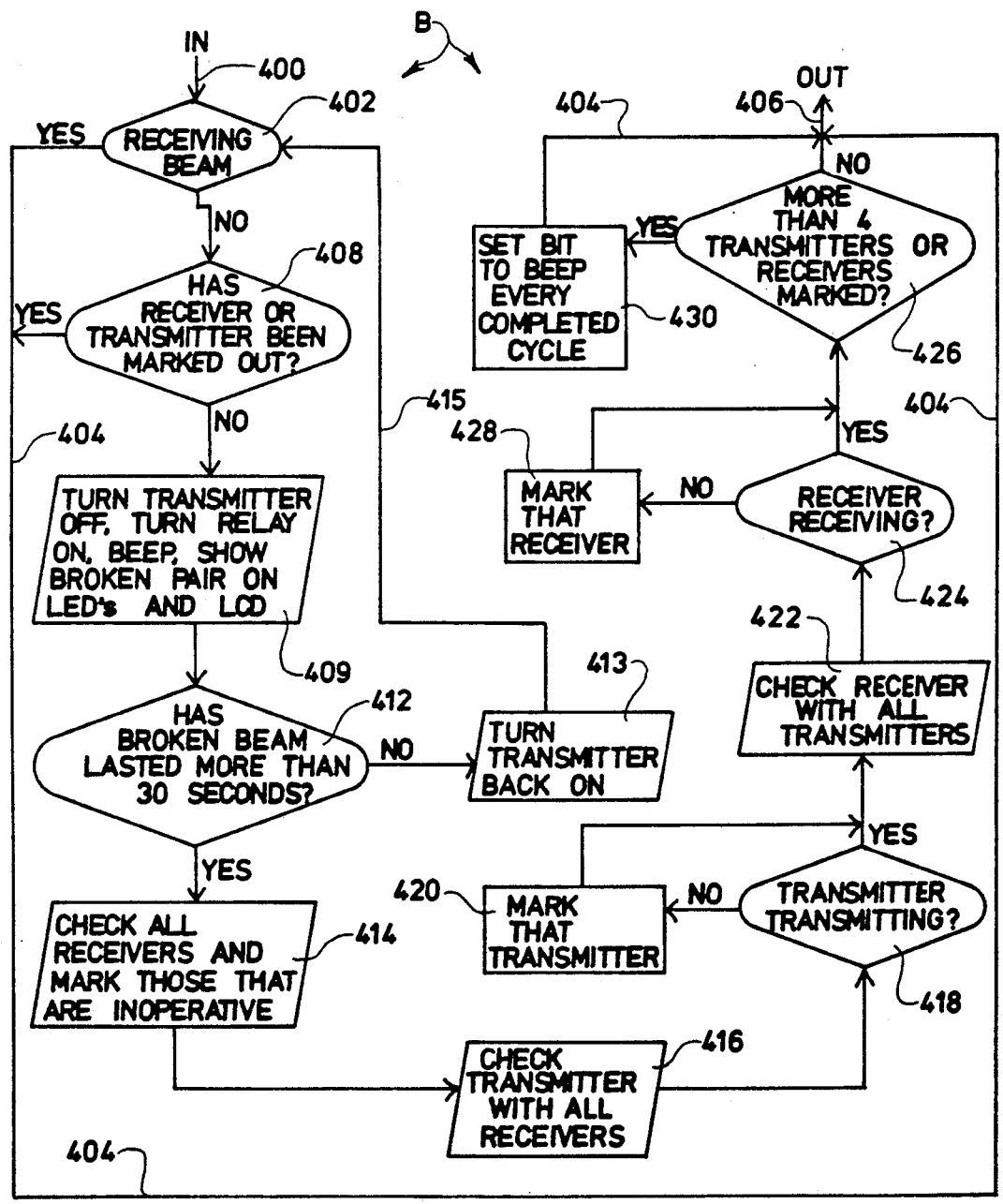

With primary reference now directed to FIG. 14, implementation of sub-routine B diagrammatically begins with line 400 and a "receiving beam" check step 402. In this step the particular receiver that is no being checked will either respond or not respond to the particular transmitter that is on in its loop. For example, in step 402 if the first transmitter step 374 of FIG. 12 has occurred then step 402 (FIG. 14) will be looking for confirmation from receiver step 376 (FIG. 12). If reception is confirmed then as indicated by loop 404 and line 406, subroutine B will be exited. After the check receiver step 376 (FIG. 12) successfully reports energy from transmission step 374, sub-routine B (FIG. 14) will be successfully looped out and receiver step 377 (FIG. 12) and successive receiver steps will be executed. Each will again run sub-routine "B."

If no receiving beam is detected in step 402 (FIG. 14), subroutine B will determine whether that receiver or transmitter has been "marked out" in step 408. If the receiver or transmitter has been marked out, it returns to loop 404 and the sub-routine will be completed. If the transmitter has not been marked out, step 408 activates sub-routine 409 that will turn that particular transmitter off, and activate control relay 237 (FIG. 6) to open the elevator doors. At the same time appropriate diagnostic LED's 213, 218 (FIG. 6) will be activated to display to the service technician which beam path has been broken.

Step 412 queries whether a broken beam has lasted more than thirty seconds. If not the transmitter is reactivated in step 413 which returns to step 402 as indicated by line 415. If so step 414 marks the inoperative receivers after an appropriate check, and checks transmitters with all receivers on at once in step 416. Step 418 determines if the transmitter was transmitting; if not, step 420 marks out a blocked transmitter, and if so, step 422 checks that receiver station with all transmitter stations. In this manner the computer logic intelligently determines whether or not a beam is permanently or temporarily blocked, and differentiates between an act of vandalism or a broken part, for example, and an erratic intrusion into the monitored entrance way. If the receiver station is not sensed in step 424 then it is marked out in step 428. If it is working step 426 follows, and if more than four transmitters or receivers are marked out a beeping step 430 is implemented to provide a warning to the service technician. Sub-routine B is then exited on loop 404.

If no more than four receivers or transmitters are marked in step 426 then exit occurs on loop 404, which returns to checking of the next receiver (or the turning on of the next sequential transmitter) in the routines of FIGS. 11-13.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A system for detecting intrusions within a monitored space, said system comprising:
   a plurality of spaced apart transmitters adapted to be disposed along one side of said space for radiating signals across said space;
   a plurality of spaced apart receivers adapted to be disposed along an opposite side of said space for detecting the presence or absence of signals radiated by said transmitters;
   circuit means for operating said transmitters and said receivers, said circuit means comprising means for establishing a long beam pattern and a short beam pattern, and means for switching between said long and short beam patterns depending upon the width of said space.

2. The system as defined in claim 1 wherein said circuit means comprises means for establishing and monitoring a shepherd beam across said space, and means responsive to said monitoring means for activating said means for switching between said long and short beam patterns in response to the presence or absence of said shepherd beam.

3. The system as defined in claim 1 wherein said means for establishing a long beam pattern serially activates said transmitters and, each time a transmitter is activated, serially polls a preselected number of receivers.

4. The system as defined in claim 3 wherein said means for establishing a short beam pattern serially activates said transmitters and, each time a transmitter is activated, serially polls a reduced number of receivers.

5. The system as defined in claim 4 wherein said circuit means comprises means for establishing and monitoring a shepherd beam across said space, and means responsive to said monitoring means for activating said means for switching between said long and short beam patterns in response to the presence or absence or said shepherd beam.

6. The system as defined in claim 1 wherein said circuit means comprises means for selecting and marking out those transmitters and/or receivers which are judged to be inoperative, so that said system continues to function and monitor said space even though pathways between certain transmitters and certain receivers have been semi-permanently obstructed.

7. The system as defined in claim 6 wherein said circuit means comprises means for establishing and monitoring a shepherd beam across said space, and means responsive to said monitoring means for activating said means for switching between said long and short beam patterns in response to the presence or absence of said shepherd beam.

8. The system as defined in claim 6 wherein said means for establishing a long beam pattern serially activates said transmitters and, each time a transmitter is activated, serially monitors a preselected number of receivers.

9. The system as defined in claim 8 wherein said means for establishing a short beam pattern serially activates said transmitters and, each time a transmitter is activated, serially monitors a reduced number of receivers less than said preselected number of receivers.

10. The system as defined in claim 9 wherein said circuit means comprises means for establishing and monitoring a shepherd beam across said space, and means responsive to said monitoring means for activating said means for switching between said long and short beam patterns in response to the presence or absence of said shepherd beam.

11. A system for detecting intrusions within a monitored space, said system comprising:
    a plurality of spaced apart transmitter stations for radiating signals across said space;
    a plurality of spaced apart receiver stations for detecting the presence or absence of signals radiated by said transmitters;
    circuit means for sequentially activating said transmitter stations and sequentially polling said receiver stations to monitor a plurality of beams across said space, wherein the interruption of a beam generally indicates an intrusion; and,
    means for determining and marking out inoperative beams so that said system continues to function and monitor said space even though particular beams normally established by said system have ceased at least temporarily.

12. The system as defined in claim 11 wherein said circuit means comprises means for reactivating previously marked out beams.

13. The system as defined in claim 11 wherein said circuit means comprises means for providing a warning when more than a preselected limited number of beams have been marked out.

14. The system as defined in claim 11 wherein said means for determining and marking out inoperative beams comprises means for testing individual transmitter stations by attempting to read the transmitter station with a plurality of receiver stations, and means for marking out those transmitter stations judged to be inoperative without disabling said system.

15. The system as defined in claim 11 wherein said means for determining and marking out inoperative beams comprises means for testing individual receiver stations by attempting to transmit to them with a plurality of transmitter stations, and means for marking out those receiver stations judged to be inoperative without disabling said system.

16. The system as defined in claim 15 wherein said means for determining and marking out inoperative beams comprises means for testing individual transmitter stations by attempting to read the transmitter station with a plurality of receiver stations, and means for marking out those transmitter stations judged to be inoperative without disabling said system.

17. The system as defined in claim 16 wherein said circuit means comprises means for reactivating previously marked out beams upon preselected circumstances.

18. The system as defined in claim 11 wherein said circuit means establishes a long beam pattern and a short beam pattern, and comprises mean for switching between said long and short beam patterns depending upon the width of said space.

19. The system as defined in claim 18 wherein said circuit means comprises means for establishing and monitoring a shepherd beam across said space, and means responsive to said monitoring means for activating said means for switching between said long and short beam patterns in response to the presence or absence of said shepherd beam.

20. The system as defined in claim 19 wherein said means for establishing a long beam pattern serially activates said transmitter stations and, each time a transmitter station is activated, serially polls a preselected number of receiver stations, and said means for establishing a short beam pattern serially activates said transmitter stations and, each time a transmitter station is activated, serially polls a reduced number of receiver stations.

21. The system as defined in claim 20 wherein said means for determining and marking out inoperative beams comprises means for testing individual transmitter stations by attempting to read the transmitter station with a plurality of receiver stations, and means for marking out those transmitter stations judged to be inoperative without disabling said system.

22. The system as defined in claim 21 wherein said circuit means comprises means for providing a warning when more than a preselected limited number of said transmitter stations have been marked out.

23. The system as defined in claim 20 wherein said means for determining and marking out inoperative beams comprises means for testing individual receiver stations by attempting to transmit to them with a plurality of transmitter stations, and means for marking out those receiver stations judged to be inoperative without disabling said system.

24. The system as defined in claim 20 further comprising means for automatically reactivating previously marked out beams.

25. A self correcting intrusion detection system for elevators comprising a pair of sliding doors with an elevator car entrance way disposed therebetween, said system comprising:
    a plurality of spaced apart transmitter stations adapted to be secured to a first one of said doors for radiating signals across said entrance way toward the other door;

a plurality of spaced apart receiver stations adapted to be secured to said other door for detecting the presence or absence of signals radiated between said doors;

circuit means for monitoring beams established between said transmitter stations and said receiver stations, said circuit means comprising means for establishing a long beam pattern and a short beam pattern, and means for switching between said long and short beam patterns depending upon the spacing of said doors.

26. The system as defined in claim 25 wherein said circuit means comprises means for establishing and monitoring a shepherd beam across said space, and means responsive to said monitoring means for activating said means for switching between said long and short beam patterns in response to the presence or absence of said shepherd beam.

27. The system as defined in claim 26 wherein said means for establishing a long beam pattern serially activates said transmitter stations and, each time a transmitter station is activated, serially monitors a preselected number of receiver stations.

28. The system as defined in claim 27 wherein said means for establishing a short beam pattern serially activates said transmitter stations and, each time a transmitter station is activated, serially monitors a reduced number of receiver stations.

29. The system as defined in claim 25 wherein said circuit means comprises means for selecting and marking out those transmitter stations and/or receiver stations that are judged to be inoperative, so that said system continues to function and monitor said space even though pathways between certain transmitter stations and certain receiver stations have been semi-permanently obstructed.

30. The system as defined in claim 28 wherein said circuit means comprises means for selecting and marking out those transmitter stations and/or receiver stations which are judged to be inoperative, so that said system continues to function and monitor said space even though pathways between certain transmitter stations and certain receiver stations have been semi-permanently obstructed.

31. An intrusion detection system for elevators comprising a pair of sliding doors with an elevator car entrance way disposed therebetween, said system comprising:

a plurality of spaced apart transmitter circuits adapted to be secured to a first one of said doors, each transmitter circuit comprising at least one infrared transmitter station for radiating modulated light across said entrance way toward the other door;

a plurality of spaced apart receiver circuits adapted to be secured to said other door, each receiver circuit comprising at least one receiver station for detecting the presence or absence of modulated infrared signals;

micro controller means for sequentially activating said receiver stations and said transmitter stations to establish and monitor a plurality of through beams extending between said doors, said micro controller means interconnected with each of said transmitter circuits through a transmitter bus and to each of said receiver circuits through a receiver bus; and, means for establishing a long beam pattern or a short beam pattern, and operable to switch between said long and short beam patterns depending upon the spacing of said doors.

32. The system as defined in claim 31 wherein said micro controller establishes and monitors a shepherd beam between said doors, and switches between said long and short beam patterns in response to the presence or absence of said shepherd beam.

33. The system as defined in claim 31 wherein each of said transmitter circuits comprises:

DMUX means for generating a logical output on one of a plurality of DMUX output lines in response to application by said micro controller of a binary signal on said transmitter bus;

a plurality of AND gates having first and second inputs, the first input connected to one of said DMUX lines;

user programmable jumper means for establishing which transmitter station will be activated in response to a particular binary number on said transmitter bus, said jumper means connected to second inputs of said AND gates; and, means responsive to said AND gates for activating a transmitter station.

34. The system as defined in claim 31 wherein each of said receiver circuits comprises:

MUX means for polling a desired receiving station in response to application by said micro controller of a binary signal on said receiver bus;

a plurality of AND gates having first and second inputs, the first input connected to one of said receiver stations;

user programmable jumper means for establishing which receiver station will be polled in response to a particular binary number on said receiver bus, said jumper means connected to second inputs of said AND gates; and, a plurality of inputs on said mux means for receiving information from said AND gate means.

35. The system as defined in claim 34 wherein said micro controller selects and marks out those transmitter stations and/or receiver stations which are judged to be inoperative, so that said system continues to function and monitor said doors even though certain beams have been semi-permanently obstructed.

36. An intrusion detection system for elevators comprising a pair of sliding doors with an elevator car entrance way disposed therebetween, said system comprising:

a plurality of spaced apart, transmitter circuits adapted to be secured to a first one of said doors, each transmitter circuit comprising at least one infrared transmitter station for radiating modulated light across said entrance way toward the other door;

a plurality of spaced apart, receiver circuits adapted to be secured to said other door, each receiver circuit comprising at least one receiver station for detecting the presence or absence of modulated infrared signals;

micro controller means for sequentially activating said receiver stations and said transmitter stations to establish and monitor a plurality of through beams extending between said doors, said micro controller means interconnected with each of said transmitter circuits and said receiver circuits;

wherein said micro controller means determines and marks out those transmitter stations and/or receiver stations which are at least temporarily inoperative, so that said system continues to function and monitor said doors even though certain beams have been semi-permanently obstructed.

37. The system as defined in claim 36 further comprising means for reactivating previously marked-out transmitter and receiver stations upon preselected conditions.

38. The system as defined in claim 36 wherein each of said transmitter circuits comprises:

DMUX means for generating a logical output on one of a plurality of DMUX output lines in response to application by said micro controller of a binary signal on said transmitter bus;

a plurality of AND gates having first and second inputs, the first input connected to one of said DMUX lines;

user programmable jumper means for establishing which transmitter station will be activated in response to a particular binary number on said transmitter bus, said jumper means connected to second inputs of said AND gates; and, means responsive to said AND gates for activating a transmitter station.

39. The system as defined in claim 36 wherein each of said receiver circuits comprises:

MUX means for polling a desired receiving station in response to application by said micro controller of a binary signal on said receiver bus;

a plurality of AND gates having first and second inputs, the first input connected to one of said receiver stations;

user programmable jumper means for establishing which receiver station will be polled in response to a particular binary number on said receiver bus, said jumper means connected to second inputs of said AND gates; and, a plurality of inputs on said mux means for receiving information from said AND gate means.

40. The system as defined in claim 38 further comprising means for reactivating previously marked-out transmitter and receiver stations upon preselected conditions.

41. The system as defined in claim 39 further comprising means for reactivating previously marked-out transmitter and receiver stations upon preselected conditions.

42. A method for monitoring a space and detecting intrusions therewithin, said method comprising the steps of:

sequentially radiating signals across said space with a plurality of transmitters;

sequentially sensing for said signals with a plurality of spaced apart receivers disposed along an opposite side of said space;

determining the presence or absence of an intrusion in accordance with the establishment or blockage of beams between said transmitters and receivers; and, executing either a long beam pattern or a short beam pattern depending upon the width of said space.

43. The method as defined in claim 42 wherein said executing step comprises the steps of establishing and monitoring a shepherd beam, and switching between said long and short beam patterns in response to the presence or absence of said shepherd beam.

44. The method as defined in claim 42 wherein said execution step comprises the steps of serially activating said transmitters and, each time a transmitter is activated, serially polling a preselected number of receivers.

45. The method as defined in claim 42 wherein a lesser number of receivers are polled during execution of said short beam pattern than during execution of said long beam pattern.

46. The method as defined in claim 42 further comprising the steps of at least temporarily marking out inoperative beams.

47. The method as defined in claim 46 further comprising the step of reactivating previously marked out inoperative beams in response to preselected conditions.

48. The method as defined in claim 46 wherein said marking out step comprises the further steps of testing individual transmitters by attempting to read the transmitter with a plurality of receivers, and disabling that transmitter if it is not heard by at least one receiver.

49. The method as defined in claim 46 further comprising the step of providing a warning when more than a preselected limited number of said transmitters have been marked out.

50. The method as defined in claim 46 wherein said marking out step comprises the further step of testing individual receivers by attempting to transmit to them with a plurality of transmitters, and disabling those receivers which do not respond to any transmitters.

51. The method as defined in claim 50 further comprising the step of providing a warning when more than a preselected limited number of said receivers have been marked out.

52. The method as defined in claim 51 further comprising the step of reactivating previously marked out receivers in response to preselected conditions.

53. An intrusion detection method for monitoring a space such as the area between elevator doors and for and detecting intrusions therewithin, said method comprising the steps of:

establishing a redundant number of beam pathways across said space;

determining the presence or absence of an intrusion in accordance with the blockage of said beam pathways;

periodically testing for inoperative beam pathways; and, marking out inoperative beam pathways without disturbing said determining step.

54. The method as defined in claim 53 further comprising the step of providing a warning when more than a preselected limited number of beam pathways have been marked out.

55. The method as defined in claim 53 further comprising the step of reactivating previously marked out beam pathway in response to preselected conditions.

56. The method as defined in claim 53 further comprising the step of executing either a long beam pattern or a short beam pattern depending upon the width of said space, said executing step comprising the further steps of establishing and monitoring a shepherd beam, and switching between said long and short beam patterns in response to the presence or absence of said shepherd beam.

57. The method as defined in claim 56 further comprising the step of reactivating previously marked out beam pathways in response to preselected conditions.

58. An intrusion detection method for monitoring a space such as the area between elevator doors and for and detecting intrusions therewithin, said method comprising the steps of:
   sequentially radiating signals across said space with a plurality of transmitters;
   sequentially sensing for said signals with a plurality of receivers;
   determining the presence or absence of an intrusion in accordance with the establishment or blockage of beams established between said transmitters and said receivers;
   periodically testing for inoperative receivers and transmitters; and,
   at least temporarily marking out inoperative transmitters and/or receivers without disturbing said determining step.

59. The method a defined in claim 58 further comprising the step of reactivating previously marked out receivers and/or transmitters in response to preselected conditions.

60. The method as defined in claim 58 wherein said testing step comprises the further steps of attempting to read each transmitter with a plurality of receivers, and disabling that transmitter if it is not heard by at least one receiver.

61. The method as defined in claim 60 further comprising the step of providing a warning when more than a preselected limited number of said transmitters have been marked out.

62. The method as defined in claim 59 wherein said testing step comprises the further step of monitoring individual receivers while attempting to transmit to them with a plurality of transmitters, and disabling those receivers which do not respond to any transmitters.

63. The method as defined in claim 62 further comprising the step of providing a warning when more than a preselected limited number of said receivers have been marked out.

64. The method as defined in claim 58 further comprising the step executing either a long beam pattern or a short beam pattern depending upon the width of said space, said executing step comprising the further steps of establishing and monitoring a shepherd beam, and switching between said long and short beam patterns in response to the presence or absence of said shepherd beam.

65. The method as defined in claim 64 further comprising the step of reactivating previously marked out receivers and/or transmitters in response to preselected conditions.

* * * * *